(12) United States Patent
Tayama et al.

(10) Patent No.: US 6,912,989 B2
(45) Date of Patent: Jul. 5, 2005

(54) FUEL INJECTION CONTROL DEVICE FOR A DIRECT FUEL INJECTION ENGINE

(75) Inventors: Akira Tayama, Yokosuka (JP); Hirofumi Tsuchida, Yokosuka (JP); Toshikazu Shiino, Chigasaki (JP); Taisuke Shiraishi, Yokohama (JP); Koji Hiraya, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/808,302

(22) Filed: Mar. 25, 2004

(65) Prior Publication Data
US 2004/0216714 A1 Nov. 4, 2004

(30) Foreign Application Priority Data
Apr. 30, 2003 (JP) .................................. 2003-125192
May 1, 2003 (JP) .................................. 2003-126345

(51) Int. Cl.[7] .............................. F02B 3/02; F02F 3/26
(52) U.S. Cl. ..................... 123/276; 123/295; 123/299
(58) Field of Search ................................ 123/276, 279, 123/295, 299, 300, 305

(56) References Cited

U.S. PATENT DOCUMENTS

| | | | | |
|---|---|---|---|---|
| 6,401,688 B2 | * | 6/2002 | Teraji et al. ................ | 123/295 |
| 6,715,463 B2 | * | 4/2004 | Kudo et al. ................. | 123/261 |
| 6,739,309 B2 | * | 5/2004 | Hiraya et al. ............... | 123/279 |
| 6,792,912 B2 | * | 9/2004 | Kikuchi et al. ............. | 123/294 |
| 6,814,046 B1 | * | 11/2004 | Hiraya et al. ............... | 123/294 |

FOREIGN PATENT DOCUMENTS

| JP | 11-82028 A | 3/1999 |
|---|---|---|
| JP | 2001-271688 A | 10/2001 |

* cited by examiner

Primary Examiner—Hai Huynh
(74) Attorney, Agent, or Firm—Shinjyu Global IP Counselors, LLP

(57) ABSTRACT

A fuel injection control device for a direct fuel injection engine is configured to selectively control a fuel injection valve, which is configured and arranged to directly inject a first fuel stream per cycle into a combustion chamber, to use a first fuel injection timing when the controller determines that a stratified air-fuel mixture will be difficult to form during a second fuel injection timing based on a determination of an engine operation parameter by at least one sensor. The first fuel injection timing is set to control the injection valve to inject the first fuel stream during an intake stroke while a piston in the combustion chamber is approximately at an intake top dead center position such that a majority of the first fuel stream injected from the fuel injection valve is received inside a cavity formed on the piston.

28 Claims, 22 Drawing Sheets

FUEL INJECTION CONTROL DEVICE FOR A DIRECT FUEL INJECTION ENGINE

BACKGROUND OF THE INVENTION

1. Field of the Invention

The present invention relates to a fuel injection control device for a direct fuel injection engine. More specifically, the present invention relates to a fuel injection control device for performing a stable stratified combustion when engine temperature is relatively low and/or when a fuel pressure is relatively low.

2. Background Information

In conventional direct fuel injection engines, if fuel is injected during an intake stroke when the temperature of the engine is relatively low, e.g., cold starting condition, or when the fuel pressure is relatively low, then the fuel injected into the combustion chamber forms a homogeneous air-fuel mixture with some of the fuel stick to the cylinder wall. As a result, the amount of fuel that does not contribute to combustion increases. Therefore, a total fuel injection amount has to be greatly increased, which causes a large amount of HC to be produced. In order to solve this problem, Japanese Laid-Open Patent Publication No. 2001-271688 discloses a method of starting a direct fuel injection engine for achieving stratified combustion during cold starting by injecting the fuel during the compression stroke. More specifically, the method described in the above mentioned reference discloses a piston top surface provided with a cavity having a substantially cylindrical peripheral wall surface, a bottom wall surface smoothly connected to the peripheral wall surface, and a substantially cone-shaped bulge portion smoothly connected with the bottom wall surface. Moreover, a spark plug is positioned in substantially directly above the bulge portion. In the above mentioned reference, a fuel injection valve is positioned configured to directly inject a fuel stream into a combustion chamber with a substantially hollow circular cone shape from an upper part of the combustion chamber. Since the fuel is injected during the compression stroke in the direct fuel injection engine disclosed in the above mentioned reference, the amount of fuel that sticks to the cylinder wall and the amount of HC produced are reduced.

Moreover, in order to steadily ignite and combust the agglomerate air-fuel mixture in the direct fuel injection engine in the above mentioned reference, it is important for an agglomerate air-fuel mixture having the appropriate size and air-fuel ratio for the engine operating conditions (rotational speed and load) to be formed above the cavity. From the standpoint of reducing exhaust emissions, it is also desirable for the air-fuel ratio to be uniform throughout the agglomerate air-fuel mixture. If rich portions exist within the air-fuel ratio distribution of the agglomerate air-fuel mixture, unburned hydrocarbons (HC) and carbon monoxide (CO) will increase and localized high combustion temperatures will cause NOx to be produced. On the other hand, if there are lean portions within the air-fuel ratio distribution, the lean portions will quench the flame and cause unburned HC and CO to increase.

Consequently, in the method described in the above reference, the fuel is injected from the fuel injection valve during the compression stroke to form a substantially hollow circular cone shaped fuel stream that collides against the peripheral wall surface of the cavity. As the fuel that has struck against the peripheral wall surface of the cavity vaporizes, the fuel gathers toward the bulge portion of the cavity and forms an agglomerate air-fuel mixture in the space above the cavity.

In view of the above, it will be apparent to those skilled in the art from this disclosure that there exists a need for an improved fuel injection control device. This invention addresses this need in the art as well as other needs, which will become apparent to those skilled in the art from this disclosure.

SUMMARY OF THE INVENTION

It has been discovered that the vaporization ratio of the fuel inside the combustion chamber decreases rapidly when the fuel injection timing is retarded toward the compression stroke. Since the amount of time between fuel injection and ignition is inherently short when the fuel is injected during the compression stroke, when the engine temperature is below a prescribed value, the fuel that adheres to the cavity wall does not sufficiently vaporize by the time of ignition. Also, when the fuel pressure is below a prescribed value, the speed of the fuel stream in the injection direction is small and the fuel that adheres to the cavity wall does not sufficiently vaporize. Thus, when the fuel is injected during the compression stroke in the conventional direct fuel injection engine disclosed in the above mentioned reference, the time between fuel injection and ignition is short and the fuel cannot vaporize sufficiently before the time of ignition is reached. The fuel cannot vaporize sufficiently particularly during cold starting when the temperature inside the combustion chamber is low and/or the atomization of the fuel is insufficient because the fuel pressure is low. In such a case, a donut-shaped agglomerate air-fuel mixture is formed above the cavity. Since little or no fuel exists in a center portion (donut hole portion) of the donut-shaped agglomerate air-fuel mixture, misfiring will occur if the spark plug, which is positioned substantially directly above the bulge portion of the cavity, is positioned in the donut hole portion of the agglomerate air-fuel mixture. Thus, in such a case, it is difficult to conduct stable stratified combustion. Moreover, when the fuel cannot vaporize sufficiently, it is necessary to increase the quantity of fuel injected and the fuel economy degrades.

On the other hand, if the fuel is injected during the intake stroke so as to obtain a comparatively long period of time until ignition, a homogeneous air-fuel mixture will develop and fuel will stick to the cylinder wall surface. In such a case the fuel injection amount and the amount of HC emissions are increased.

Therefore, one of the objectives of the present invention is to achieve stable stratified combustion even when the engine temperature is below a prescribed value and/or the fuel pressure is below a prescribed value.

Another objective of the present invention is to provide a sufficient fuel vaporization time by injecting the fuel during an intake stroke while the piston is approximately at an intake top dead center position and adjust the fuel injection to reduce the amount of fuel that sticks to the wall surface of the cylinder, thereby avoiding excess fuel injection.

In order to achieve the above mentioned and other objectives, a fuel injection control device for a direct fuel injection engine is provided that comprises a fuel injection valve, at least one sensor and a controller. The fuel injection valve is configured and arranged to directly inject a first fuel stream per cycle into a combustion chamber. The at least one sensor is configured and arranged to determine at least one engine operation parameter that affects formation of a stratified air-fuel mixture inside the combustion chamber The controller is configured to selectively control the fuel injection valve to use a first fuel injection timing when the controller determines that a stratified air-fuel mixture will be difficult to form during a second fuel injection timing based on a determination of the engine operation parameter by the at least one sensor, the first fuel injection timing being set to control the injection valve to inject the first fuel stream during an intake stroke while a piston in the combustion chamber is approximately at an intake top dead center position such that a majority of the first fuel stream injected from the fuel injection valve is received inside a cavity formed on the piston.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
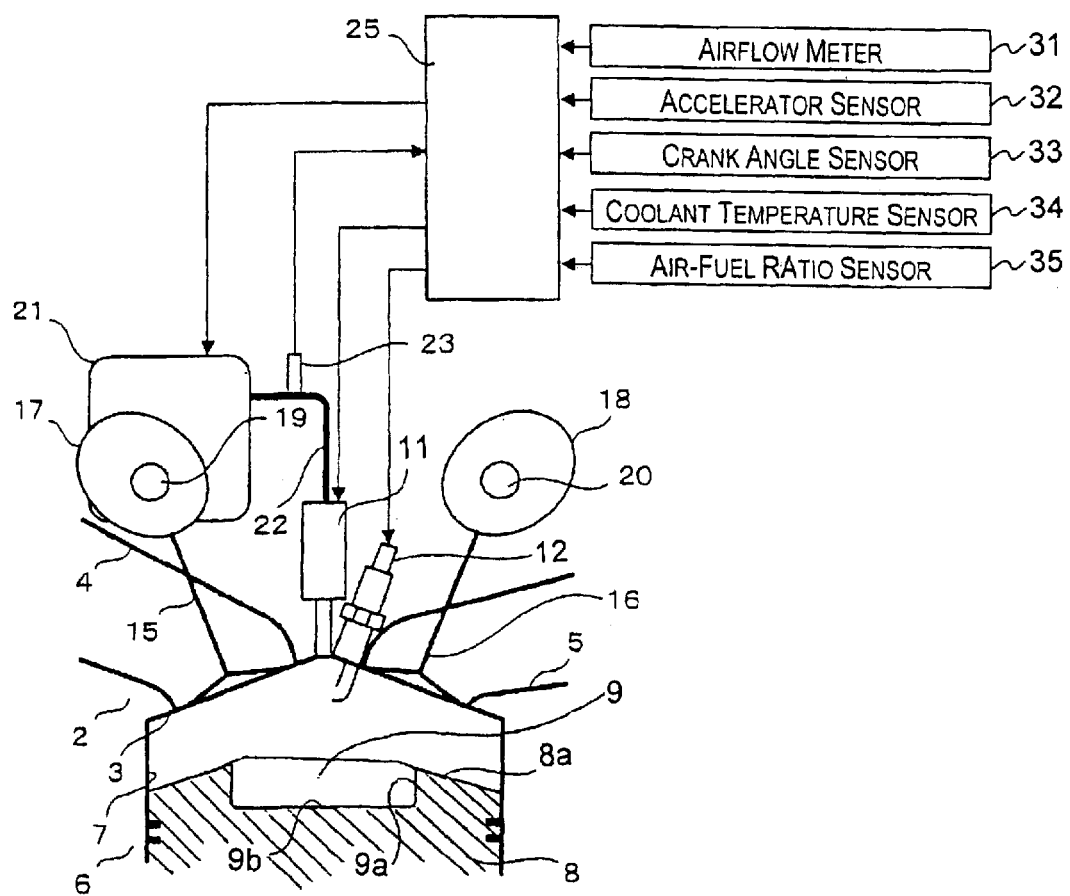
FIG. 1 is a schematic partial cross sectional view of an injection portion of a direct fuel combustion engine utilizing a fuel injection control device in accordance with a first embodiment of the present invention.

Referring initially to FIGS. 1–7, a fuel injection control device for a direct fuel injection engine is illustrated in accordance with a first embodiment of the present invention. FIG. 1 is a schematic partial cross sectional view of an injection portion of a direct fuel injection engine utilizing the fuel injection control device of the first embodiment. As shown in FIG. 1, a cylinder head 2 forms a pent-roof-shaped combustion chamber 3 having a roof that slants substantially equally to the left and right of FIG. 1. On the left and right hand sides, respectively, of the roof are provided with an air intake port 4 for introducing air and an exhaust port 5 for discharging post-combustion gases. A cylinder 7, which is oriented vertically in FIG. 1, is provided in a cylinder block 6 and a piston 8 slides up and down inside the cylinder 7. A fuel injection valve 11 and a spark plug 12 are preferably disposed at a substantially upper center portion of the combustion chamber as seen in FIG. 1. An intake valve 15 and an exhaust valve 16 are configured and arranged to open and close the intake and exhaust ports 5 and 6, respectively, in conjunction with the motion of the piston 8. A pair of cams 17 and 18 are fixed to engine-driven camshafts 19 and 20, respectively, and configured to press the intake and exhaust valves 15 and 16, respectively, downward against springs.

With the first embodiment of the present invention, when the engine temperature is relatively low, such as during a cold-starting condition after the engine is first started, the fuel is injected at such timing that substantially the majority of fuel is received inside a piston cavity 9. Thus, the occurrence of fuel being injected from a fuel injection valve 11 and sticking directly to the surface of the cylinder 7 can be avoided. Moreover, in the first embodiment of the present invention the piston cavity 7 is configured to prevent vaporized fuel from diffusing to the outside of the cavity 7. Thus, the amount of fuel that sticks to the surface of the cylinder 7 is greatly reduced. Also, extra time for fuel vaporization can be secured between injection and ignition because the fuel is injected when the piston 8 is approximately at the intake top dead center position. Particularly during cold starting, the fuel injection control device of the first embodiment makes it possible to minimize the sticking of fuel to the surface of the cylinder 7 and the need to inject extra fuel to compensate for insufficient vaporization. Additionally, the fuel injection control device of the first embodiment reduces the amount of HC emissions discharged during cold starting and improve the fuel economy.

The cavity 9 is formed on a top surface 8a of the piston 8. More specifically, in the first embodiment of the present invention, the positioning of the fuel injection valve 11 and the spark plug 12 and the shape of the cavity 9 formed in the top surface 8a of the piston 8 are arranged such that a stratified combustion is facilitated when the engine temperature is relatively low such as in the cold starting condition. The fuel injection valve 11 is arranged at the approximate center position of the roof of the combustion chamber 3 such that the injection holes of the fuel injection valve 11 face vertically downward. The spark plug 12 is provided to substantially adjacent to the fuel injection valve 11. The cavity 9 formed in the top surface 8a of the piston 8 is shaped such that the cavity 9 receives and holds the fuel stream injected from the fuel injection valve 11 as seen in FIG. 1. More specifically, the piston cavity 9 is formed as being substantially cylindrical with a center axis of the cavity 9 is substantially coaxial with a center axis of the fuel stream sprayed from the fuel injection valve 11.

With the first embodiment of the present invention, when the engine temperature is relatively low, such as during a cold-starting condition after the engine is first started, the fuel is injected at such timing that substantially the majority of fuel is received inside the piston cavity 9. Thus, the occurrence of fuel being injected from the fuel injection valve 11 and sticking directly to the surface of the wall of the cylinder 7 can be avoided. Moreover, in the first embodiment of the present invention the piston cavity 9 is configured to prevent vaporized fuel from diffusing to the outside of the cavity 9. Thus, the amount of fuel that sticks to the surface of the wall of the cylinder 7 is greatly reduced. Also, extra time for fuel vaporization can be secured between injection and ignition because the fuel is injected when the piston 8 is approximately at the intake top dead center position. Particularly during cold starting, the fuel injection control device of the first embodiment makes it possible to minimize the sticking of fuel to the surface of the wall of the cylinder 7 and the need to inject extra fuel to compensate for insufficient vaporization. Additionally, the fuel injection control device of the first embodiment reduces the amount of HC emissions discharged during cold starting and improve the fuel economy.

When the engine temperature is relatively low such as during the cold starting of the engine, the vaporization of the fuel inside the combustion chamber 3 is relatively slow. Thus, when the engine temperature is relatively low, the fuel injection control device of the first embodiment is configured and arranged to inject fuel from the fuel injection valve 11 while the piston 8 is substantially in the vicinity of the intake top dead center position. In other words, the fuel is injected during the period when the piston 8 is close to the fuel injection valve 11 at timing that a majority of the fuel injected is received inside the piston cavity 9.

After the fuel is injected into the combustion chamber 3 when the piston 8 is in the vicinity of the intake top dead center position, the piston 8 descends and air flows into the combustion chamber 3 through the open intake port 4. When the piston 8 reaches a position close to the bottom dead center, the intake valve 15 is configured and arranged to close and the piston 8 begins to rise again. The fuel held inside the piston cavity 9 vaporizes as the piston 8 rises and as the piston 8 approaches the top dead center position (compression stroke), the vaporized fuel inside the piston cavity 9 curls upward. When the vaporized fuel is in the vicinity of the spark plug 12 arranged on the ceiling of the fuel chamber 3, the spark plug 12 ignites the fuel, causing combustion (stratified combustion).

The cavity 9 is configured and arranged to receive the fuel stream injected from the injection valve 11 and hold the vaporized fuel and prevent the vaporized fuel from diffusing to the outside of the cavity 9 which causes the amount of fuel to be insufficient during stratified combustion. The cavity 9 also serves to regulate the gas flow inside the combustion chamber such that the vaporized fuel properly reaches the spark plug 12. Therefore, the piston top surface 8a around the periphery of the cavity 9 is formed to slant downward in the radially outward direction.

As seen in FIG. 1, the fuel injection valve 11 is preferably installed at the substantially center portion of the roof of the combustion chamber 3. Also, the piston cavity 9 preferably has the center axis substantially coaxial with the center axis of the fuel stream sprayed from the fuel injection valve 11. Of course, it will be apparent to those skilled in the art from this disclosure that the arrangements of the fuel injection valve 11, the spark plug 12 and the cavity 9 can be varied as long as such arrangements achieve stratified combustion when the engine temperature is relatively low such as during cold starting of the engine. A predetermined fuel pressure is required in order to inject the fuel directly into the combustion chamber 3 from the fuel injection valve 11. Therefore, a high-pressure fuel pump 21 preferably driven by the intake valve camshaft 19 is configured and arranged to deliver pressurized fuel to the fuel injection valve 11 through a high-pressure fuel line 22. A fuel pressure sensor 23 provided in the high-pressure fuel line 22 is configured and arranged to send a signal to an engine controller 25. Since the required fuel pressure varies according to the operating conditions of the engine, the engine controller 25 is configured to control the operation of the high-pressure fuel pump 21 such that the actual fuel pressure matches the required fuel pressure. Of course, it will be apparent to those skilled in the art from this disclosure that the high-pressure fuel pump 21 can be arranged to be driven by an electric motor or by the torque of the engine using some mechanism other than the intake valve camshaft 19.

The engine controller 25 is configured to receive signals from an airflow meter 31, a crank angle sensor 33, and a coolant sensor 34 configured to detect various engine operation parameters. The engine controller 25 is configured to control the fuel injection of the fuel injection valve 11 and the ignition timing of the spark plug 12 such that stratified combustion is achieved when the engine temperature is relatively low such as after the engine is first started.

The engine controller 25 is also configured and arranged to receive signals from an accelerator sensor 32 and an air-fuel ratio sensor 35 and control the opening of an electronically controlled throttle valve in such a manner as to obtain the optimum torque based on the accelerator position and the engine rotational speed. After the engine has been started and the air-fuel ratio feedback control conditions have been satisfied, the engine controller 25 is configured to feedback-control the engine such that the actual air-fuel ratio detected by the air-fuel ratio sensor 35 matches the stoichiometric air-fuel ratio. The engine controller 25 is configured to selectively control the fuel injection valve to use a first fuel injection timing (single injection or multiple injections) when the engine controller 25 determines that a stratified air-fuel mixture will be difficult to form during a second fuel injection timing in which a first fuel stream is injected during a compression stroke with a majority of the first fuel stream from the fuel injection valve being received inside the cavity. This determination that a stratified air-fuel mixture will be difficult to form during the second fuel injection timing is based on selected engine operation parameters as discussed below. Moreover, as discussed below, the first fuel injection timing is set to control the injection valve to inject at least a first fuel stream during an intake stroke while a piston 8 in the combustion chamber 3 is approximately at an intake top dead center position such that a majority of the first fuel stream injected from the fuel injection valve 11 is received inside the cavity 9 formed on the piston 8.

More specifically, the engine controller 25 preferably includes a microcomputer with a control program that controls the direct fuel injection engine as discussed below. The engine controller 25 can also include other conventional components such as an input interface circuit, an output interface circuit, and storage devices such as a ROM (Read Only Memory) device and a RAM (Random Access Memory) device. The microcomputer of the engine controller 25 is programmed to control the direct fuel control engine. The memory circuit stores processing results and control programs that are run by the processor circuit. The engine controller 25 is operatively coupled to the various components of the direct fuel injection engine. The internal RAM of the engine controller 25 stores statuses of operational flags and various control data. The engine controller 25 is capable of selectively controlling any of the components of the control system in accordance with the control program. It will be apparent to those skilled in the art from this disclosure that the precise structure and algorithms for engine controller 25 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The fuel injection control executed by the engine controller 25 from the time when the engine is first started will now be described using the flowcharts of FIGS. 2–5.

Figure 2:
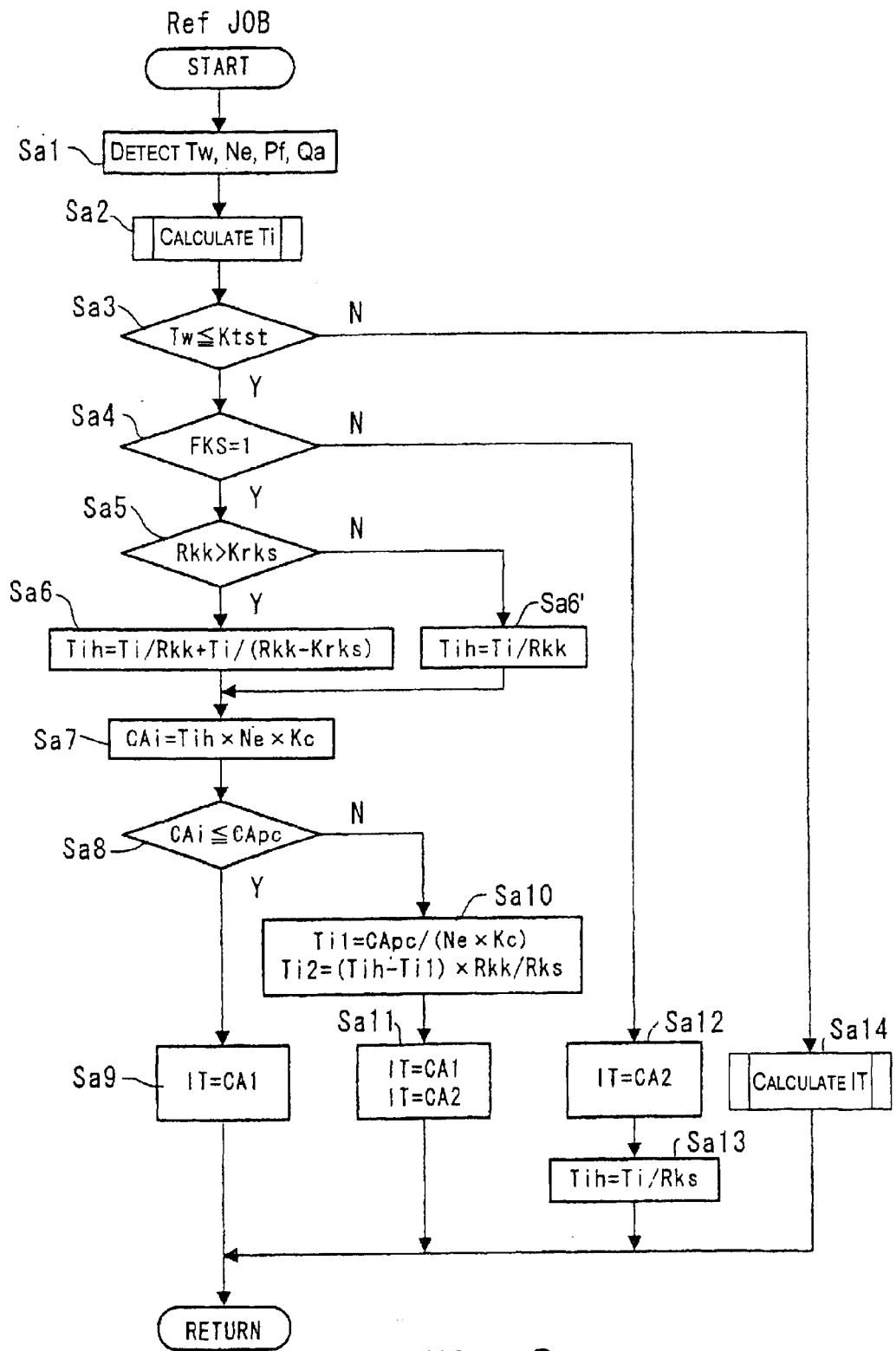
FIG. 2 is a flowchart for illustrating a control flow for calculating a fuel injection timing and a fuel injection duration from the time the engine is first started in accordance with the first embodiment of the present invention.

FIG. 2 is a flowchart (flowchart 'a') for calculating the fuel injection timing and fuel injection duration from the time when the engine is first started. The control routine illustrated in FIG. 2 is executed each time the crank angle reference position signal (Ref) is received. In step Sa1 (i.e., step 1 of the flowchart 'a'), the engine controller 25 is configured to read in a coolant temperature Tw detected by the coolant temperature sensor 34, an engine rotational speed Ne detected by the crank angle sensor 33, a fuel pressure Pf detected by the fuel pressure sensor 23, and an intake air quantity Qa detected by the airflow meter 31.

In step Sa2, a fuel injection duration Ti is calculated based on the operating state of the engine. The calculation of Ti will now be explained in further detail using the flowchart (a flowchart 'b') of FIG. 3.

Figure 3:
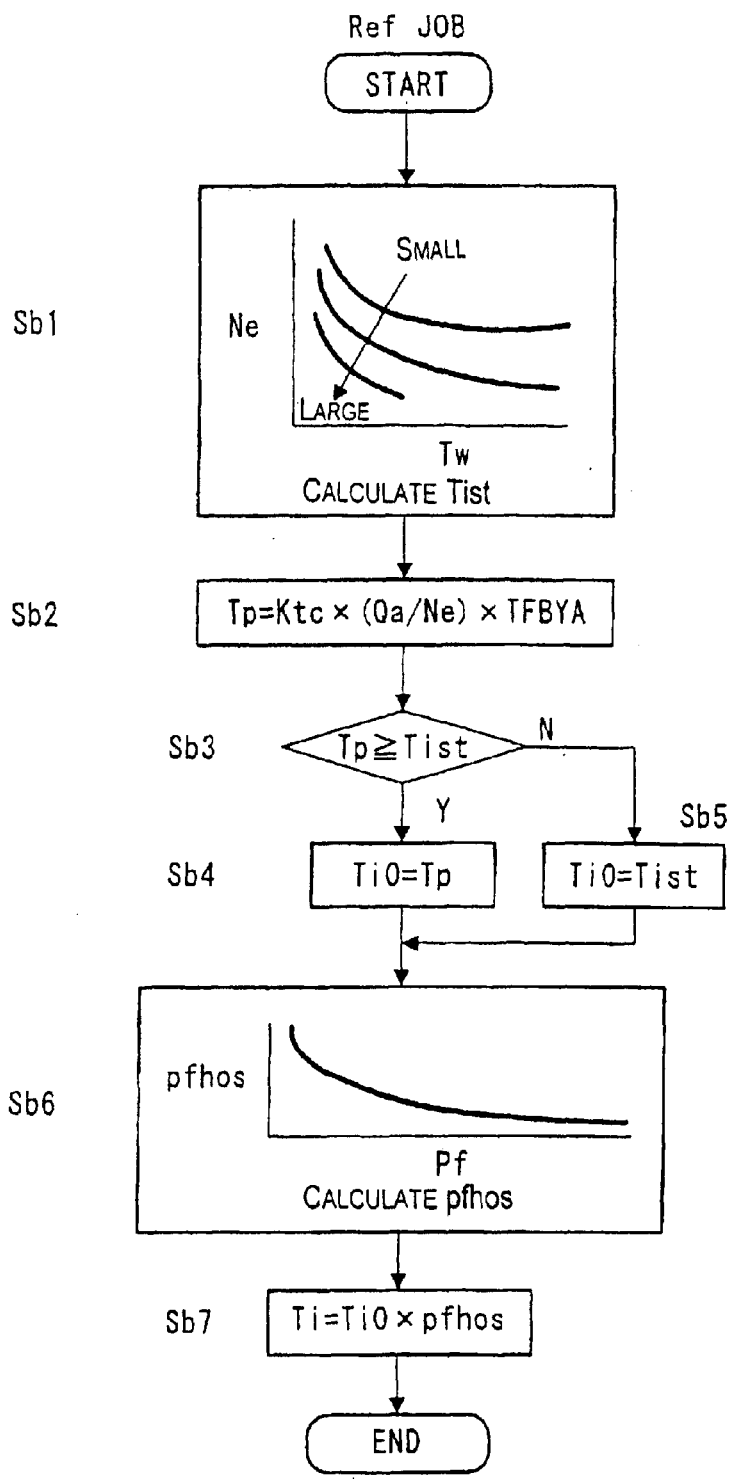
FIG. 3 is a flowchart for illustrating a control flow for calculating the fuel injection duration in accordance with the first embodiment of the present invention.

FIG. 3 is a subroutine routine of step Sa2 in FIG. 3. In step Sb1 (step 1 of the flowchart 'b'), a starting fuel injection duration Tist is found from a map of the engine rotational speed Ne and a coolant temperature Tw. The starting fuel injection duration Tist is utilized because when the engine is first started, it is necessary to bring the stopped engine up to a prescribed rotational speed. As seen in FIG. 3, the lower the coolant temperature Tw is, the larger the friction of the engine is and, thus, the larger the required torque, i.e., fuel injection amount (fuel injection duration), is. Similarly, the lower the engine rotational speed Ne is, the larger the torque required to raise the engine to the prescribed rotational speed is and, thus, the larger the required torque, i.e., fuel injection amount (fuel injection duration), is. Thus, the map of the engine rotational speed Ne and the coolant temperature Tw reflects these relationships and is used to find the starting fuel injection duration Tist.

In step Sb2, the intake air quantity Qa and the engine rotational speed Ne are used in the following equation (1) to compute a basic fuel injection duration Tp.

$$Tp = Ktc \times (Qa/Ne) \times TFBYA \tag{1}$$

In the equation (1), Ktc is a constant and TFBYA is a target equivalence ratio. The target equivalence ratio TFBYA is preferably set to a value determined in accordance with the required torque found based on the accelerator position detected by the accelerator sensor 32 and the engine rotational speed Ne. Of course, it will be apparent to those skilled in the art from this disclosure to include consideration of the coolant temperature when determining TFBYA.

In step Sb3, the starting fuel injection duration Tist and the basic fuel injection duration Tp are compared to set an initial fuel injection duration Ti0. More specifically the initial fuel injection duration Ti0 is set to the larger of the starting fuel injection duration in steps Sb4 and Sb5. The starting fuel injection duration Tist is set for the purpose of raising the engine to the prescribed rotational speed and becomes shorter as the engine rotational speed Ne increases. Thus, when the engine speed rises to a certain point, the basic fuel injection duration Tp becomes longer than the starting fuel injection duration Tist and from that point on, the basic fuel injection duration Tp is used as the initial fuel injection duration Ti0.

The fuel injection amount varies depending on the fuel pressure even if the fuel injection duration is constant. Particularly, immediately after the engine is started, the high-pressure fuel pump 21 has just started operating and the fuel pressure is varying greatly. In order to inject the required quantity of fuel, it is necessary to revise or correct the initial fuel injection duration Ti0 in accordance with the fuel pressure Pf. Therefore, a fuel pressure correcting value Pfhos is calculated in step Sb6 using a table based on the fuel pressure Pf. Then, the initial fuel injection duration Ti0 is multiplied by the fuel pressure correcting value Pfhos to obtain the final fuel injection duration Ti.

After the calculation of the fuel injection duration Ti is completed as show in the flowchart of FIG. 3, the engine controller 25 is configured to return to step Sa3 of FIG. 2.

In step Sa3 of FIG. 3, the engine controller 25 is configured to compare the coolant temperature Tw with a prescribed value Ktst (e.g., 40° C.). If the coolant temperature Tw is larger than the prescribed value Ktst, then the engine controller 25 determines that the engine is not in a cold start state and proceeds to step Sa14 where it calculates the normal fuel injection duration IT. The calculation of the normal fuel injection duration IT will now be explained using the flowchart (a flowchart 'c') of FIG. 4.

Figure 4:
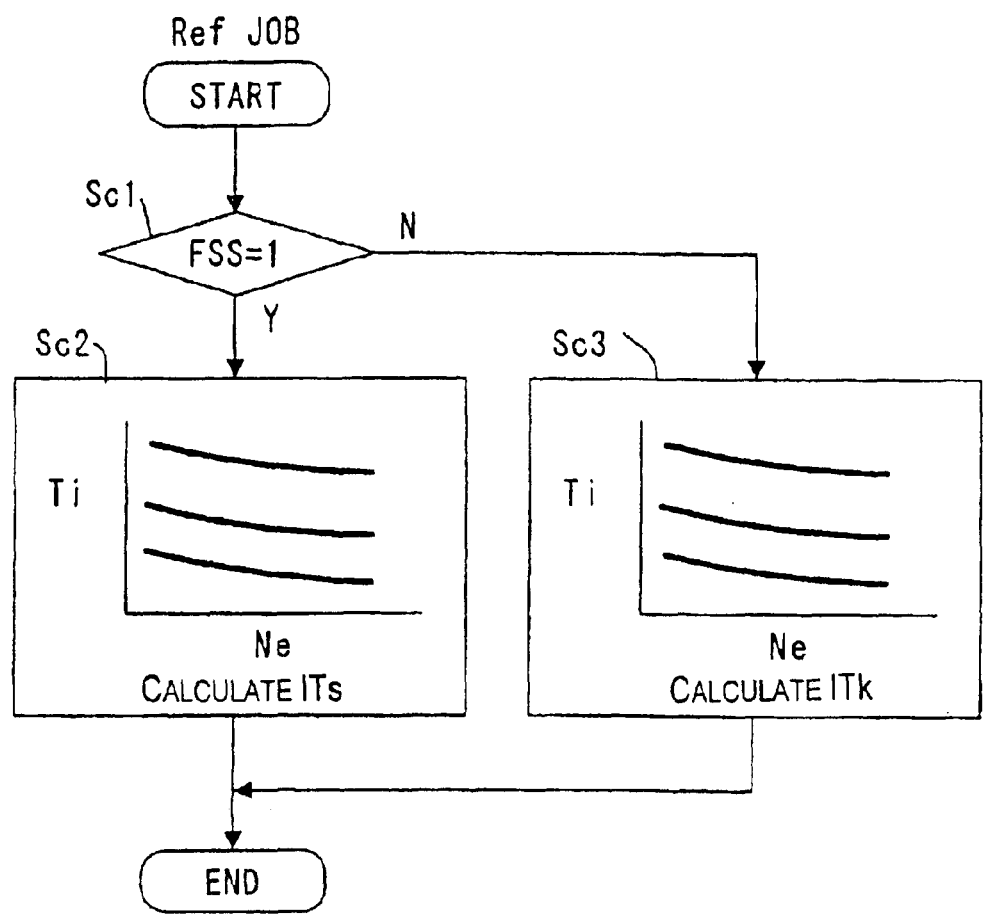
FIG. 4 is a flowchart for illustrating a control flow for calculating the fuel injection timing in accordance with the first embodiment of the present invention.

The flowchart of FIG. 4 is a subroutine of step Sa14 of FIG. 3. In step Sc1 (step 1 of the flowchart 'c') of FIG. 4, the engine controller 25 is configured to check a stratified operation flag FSS to determine if the engine is operating within a stratified combustion region or a homogeneous combustion region. The engine controller 25 is configured to set the stratified operation flag FSS to the value 1 when, based on the engine state and accelerator position, it determines that the conditions for stratified combustion exist (e.g., engine operating in low load region). The engine controller 25 sets the stratified operation flag FSS to the value 0 when it determines that such conditions for stratified combustion do not exist (e.g., engine operating in high load region).

If the stratified operation flag FSS is 1 (stratified combustion region), the engine controller 25 is configured to proceed to step Sc2. In step Sc2, the engine controller 25 is configured to calculate the fuel injection timing ITs for stratified combustion using a map based on the engine rotational speed Ne and the fuel injection duration Ti. If the stratified operation flag FSS is 0 (homogeneous combustion region), the engine controller 25 is configured to proceed to step Sc3. In step Sc3, the engine controller 25 is configured to calculate the fuel injection timing ITk for homogeneous combustion using a map based on the engine rotational speed Ne and the fuel injection duration Ti. Either ITs or ITk (whichever is calculated) is set as the fuel injection timing IT. Both of the maps used in steps Sc2 and Sc3 are established in advance based on experiments investigating the fuel economy and exhaust performance in the respective combustion regions. After completing the calculation of the fuel injection timing IT in the flowchart of FIG. 4, the engine controller 25 is configured to return to the control flow shown in FIG. 2.

If the coolant temperature Tw is equal to or less than the prescribed value Ktst in step Sa3 of FIG. 2, the engine controller 25 is configured to determine that a temperature of the wall of the cylinder 7 is low and that fuel injected into the combustion chamber 3 will readily stick to a wall surface of the cylinder 7. In such case, the engine controller 25 is configured to proceed to step Sa4 and subsequent steps so that the engine the fuel is injected at a timing that a majority of the injected fuel enters the piston cavity 9, thereby preventing the fuel from sticking on the wall surface of the cylinder 7.

More specifically, in step Sa4 the engine controller 25 is configured to check the value of an intake stratified permission flag FKS. The intake stratified permission flag FKS has a value of 1 when the fuel injection, while the piston 8 is approximately at the intake top dead center position, is permitted. The intake stratified permission flag FKS has a value of 0 when fuel injection, while the piston 8 is approximately at the intake top dead center position, is not permitted depending on the engine operation conditions. The method of setting the intake stratified permission flag FKS will be described later using the flowchart of FIG. 5. If the intake stratified permission flag FKS is 1 (if fuel injection while the piston 8 is approximately at the intake top dead center position is permitted), the engine controller 25 is configured to proceed to step Sa5. In step Sa5, the engine controller 25 is configured to compare a fuel vaporization ratio Rkk to a prescribed value Krks. The fuel vaporization ratio Rkk is set to a fuel vaporization ratio at the time of ignition when the fuel is injected while the piston 8 is approximately at the intake top dead center position. The calculation of the fuel vaporization ratio Rkk (which is the fuel vaporization ratio at the time of ignition for a case in which the fuel is injected while the piston 8 is approximately at the intake top dead center position) will also be described later using the flowchart of FIG. 5. If the fuel vaporization ratio Rkk is larger than the prescribed value Krks in step Sa5, the engine controller 25 determines that even if the majority of the injected fuel enters the piston cavity 9, a portion of the fuel that has vaporized inside the piston cavity 9 will diffuse to the outside of the piston cavity 9 and will not contribute to the stratified combustion. In such a case, it is necessary to increase the fuel injection amount by the amount of fuel that is determined to be not contributing to the stratified combustion. Thus, the engine controller 25 is configured to proceed to step Sa6. In step Sa6, the engine controller 25 is configured to revise (increase) the fuel injection duration Ti so that the fuel injection amount is increased.

In step Sa6, the fuel injection duration corresponding to the amount of fuel that does not vaporize is calculated by dividing the fuel injection duration Ti by the fuel vaporization ratio Rkk (i.e., the fuel vaporization ratio at the time of ignition for a case in which the fuel is injected while the piston 8 is approximately at the intake top dead center position). The resulting value (i.e., the fuel injection duration corresponding to the amount of fuel that does not vaporize) is added to the fuel injection duration corresponding to the amount of fuel that vaporizes and diffuses to the outside of the piston cavity 9 to obtain the revised fuel injection duration. More specifically, the engine controller 25 determines that the diffusion of vaporized fuel to the outside of the piston cavity 9 can be ignored until the fuel vaporization ratio Rkk reaches a prescribed value Krks. But when Rkk exceeds Krks, the engine controller 25 is configured to calculate the fuel injection duration corresponding to the amount of fuel that vaporizes at a ratio equal to the amount by which Rkk exceeds Krks (i.e., Rkk–Krks) by dividing Ti by the quantity Rkk–Krks. Thus, a revised fuel injection duration Tih is calculated using the following equation (2).

$$Tih = Ti/Rkk + Ti/(Rkk-Krks) \quad (2)$$

When the fuel vaporization ratio Rkk is less than the prescribed value Krks, the portion of fuel that vaporizes and diffuses to the outside of the cavity 9 can be ignored. Thus, the engine controller 25 is configured to proceed from step Sa5 to step Sa6'. In step Sa6', the vaporization ratio Rkk alone is used and the revised fuel injection duration Tih is calculated using the following equation (3).

$$Tih = Ti/Rkk \quad (3)$$

In step Sa7, the engine controller 25 is configured to calculate an injection crank angle CAi, which is the crank angle (i.e., the amount of crank angle required between when injection starts and when injection ends) required to achieve the revised fuel injection duration Tih calculated in step Sa6 or Sa6' at the current engine rotational speed Ne. The injection crank angle CAi is proportional to the revised fuel injection duration Tih and the engine speed Ne and, thus, is calculated using the following equation (4).

$$CAi = Tih \times Ne \times Kc \quad (4)$$

In the equation (4), Kc is a constant designed to make the units match.

In step Sa8, the engine controller 25 is configured to determine whether a majority of the fuel injected will go into the piston cavity 9 if the fuel is injected for the revised fuel injection duration Tih while the piston 8 is approximately at the intake top dead center position. A piston cavity crank angle range CApc corresponding to crank angles at which the fuel will enter the piston cavity 9 are substantially determined geometrically based on the fuel injection angle and the position of the piston 8 (i.e., position of the cavity 9). Therefore, the piston cavity crank angle range CApc (i.e., the range of crank angles within which the injected fuel will enter the piston cavity 9) is compared to the injection crank angle CAi. If the injection crank angle CAi is less than or equal to the piston cavity crank angle range CApc, then the engine controller 25 is configured to determine that it is possible to inject the majority of fuel into the piston cavity 9 while the piston 8 is approximately at the intake top dead center position. Thus, the engine controller 25 is configured to proceed to step Sa9. In step Sa9, the engine controller 25 is configured to set a first fuel injection timing CA1 as the fuel injection timing IT. The fuel injection timing CA1 is determined experimentally for fuel injection while the piston 8 is approximately at the intake top dead center position. Then, the engine controller 25 is configured to end the control loop. Of course, it will be apparent to those skilled in the art from this disclosure to revise or calculate the piston cavity crank angle range CApc using the engine rotational speed Ne and the fuel pressure Pf because CApc varies slightly depending on the speed of the fuel stream and the change in position of the piston cavity 9 with respect to time in accordance with the engine rotational speed Ne.

Then, when the actual crank angle matches to the fuel injection timing IT set in step Sa9 in a separate fuel injection routine (not shown), the fuel is injected for a period of time equal to the fuel injection duration Tih. Thus, the fuel can be injected while the piston 8 is approximately at the intake top dead center position in such a manner that substantially the majority of the injected fuel enters the piston cavity 9.

On the other hand, if the injection crank angle CAi exceeds the piston cavity crank angle range CApc in step Sa8, then the engine controller 25 is configured to determine a portion of the fuel will deviate from the piston cavity 9 if the fuel is injected only once as a single fuel stream while the piston 8 is approximately at the intake top dead center position. In such a case, the engine controller 25 is configured to execute a divided first fuel injection timing, i.e., a first fuel injection and a second fuel injection. Thus, the engine controller 25 is configured to proceed to step Sa10. In step Sa10, the engine controller 25 is configured to set a first fuel injection duration Ti1 for injecting the maximum amount of fuel possible into the piston cavity 9 while the piston 8 is approximately at the intake top dead center position in the first fuel injection. The engine controller 25 is further configured to set a second fuel injection duration Ti2 for injecting the remaining fuel during the compression stroke at such a timing that the majority of the remaining fuel enters the piston cavity 9 in the second fuel injection.

The first fuel injection duration Ti1 is inversely proportional to the engine rotational speed Ne (i.e., Ti1 is shorter when Ne is higher). Therefore, the first fuel injection duration Ti1 is calculated by dividing the piston cavity crank angle range CApc by the engine rotational speed Ne using the following equation (5).

$$Ti1 = CApc/(Ne \times Kc) \quad (5)$$

In the equation (5), Kc is a constant designed to make the units match.

On the other hand, the second fuel injection duration Ti2 is calculated by subtracting the first fuel injection duration Ti1 from the total injection duration Tih. However, since the second fuel injection is executed during the compression stroke, the ratio of the injected fuel that vaporizes by the time of ignition in the second fuel injection is lower than in the first fuel injection. Thus, the fuel injection amount for the second fuel injection duration Ti2 must be revised accordingly. The revision is made based on the ratio of the fuel vaporization ratio Rkk at the time of ignition for a case in which the fuel is injected while the piston 8 is approximately at the top dead center position to a vaporization ratio Rks at the time of ignition for a case in which the fuel is injected during the compression stroke. Thus, the second fuel injection duration Ti2 is calculated using the following equation (6).

$$Ti2 = (Tih - Ti1) \times (Rkk/Rks) \quad (6)$$

Figure 5:
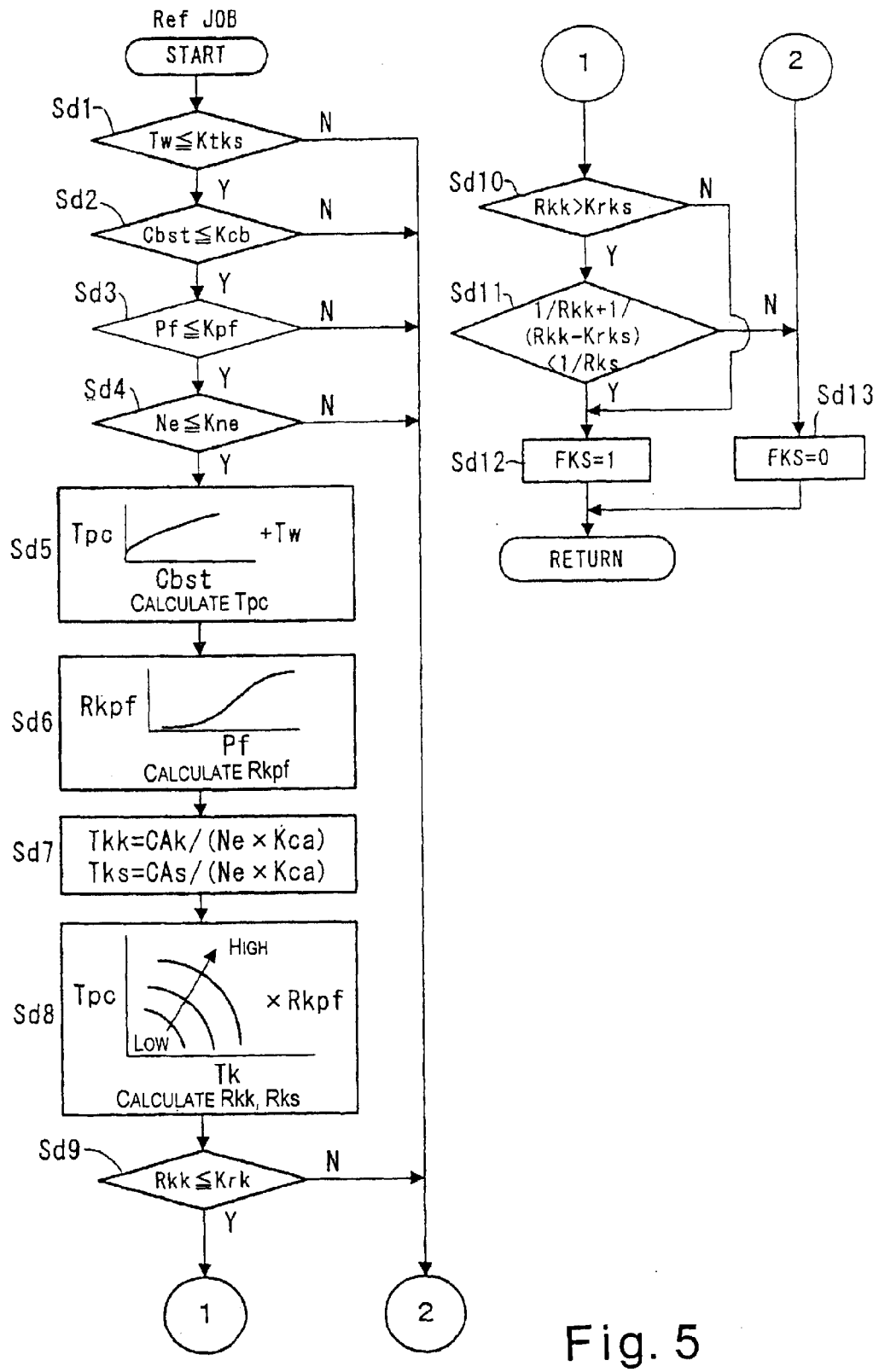
FIG. 5 is a flowchart for explaining how to set an intake stratified permission flag and how to calculate fuel vaporization ratios at the time of ignition when the fuel is injected while the piston is approximately at the intake top dead center position and when the fuel is injected while the piston is performing the compression stroke in accordance with the first embodiment of the present invention.

The calculation of the vaporization ratio Rks at the time of ignition for a case in which the fuel is injected during the compression stroke is described later in more detail using the flowchart of FIG. 5.

In step Sa11, a first divided fuel injection timing IT1 is set to the fuel injection timing CA1 with which the piston 8 will be at approximately the intake top dead center position and substantially the majority of the injected fuel will enter the piston cavity 9. Also, in step Sa11, a second divided fuel injection timing IT2 is set to a fuel injection timing CA2 with which the piston 8 will be in the compression stroke and substantially the majority of the remaining fuel injected will enter the piston cavity 9. Then the engine controller 25 is configured to end the control loop.

On the other hand, when the value of the intake stratified permission flag FKS is 0 in step Sa4, the engine controller 25 is configured to determine that the fuel injection while the piston 8 is approximately at the intake top dead center position is not permitted. In other words, the intake stratified permission flag FKS is 0 either when it is determined that the stratified combustion cannot be maintained at the time of ignition if the fuel is injected while the piston 8 is approximately at the intake top dead center position or when it is determined that the fuel injection duration for fuel injection during the compression stroke would be shorter than the fuel injection duration for fuel injection while the piston 8 is approximately at the intake top dead center position. Thus, the engine controller 25 is configured to proceed from step Sa4 to step Sa12. In step Sa12, the engine controller 25 is configured to set the fuel injection timing IT to a second fuel injection timing CA2 with which the fuel is injected while piston 8 is in the compression stroke and substantially the majority of injected fuel enters the piston cavity 9.

However, since the fuel vaporization ratio Rkk at the time of ignition for a case in which the fuel is injected while the piston 8 is approximately at the intake top dead center position is different from the fuel vaporization ratio Rks at the time of ignition for a case in which the fuel is injected during the compression stroke, a sudden change in torque occurs when the engine switches from injecting the fuel while the piston 8 is approximately at the intake top dead center position to injecting the fuel while the piston 8 is performing the compression stroke. Therefore, in step Sa13 the engine controller 25 is configured to use the fuel vaporization ratio Rks at the time of ignition for a case in which the fuel is injected during the compression stroke to calculate the revised fuel injection duration Tih using the following equation (7). Then, the engine controller 25 is configured to end the control loop.

$$Tih=Ti/Rks \quad (7)$$

The flowchart (a flowchart 'd') of FIG. 5 will now be described. The flowchart of FIG. 5 is used to set the intake stratified permission flag FKS (used in step Sa4 of FIG. 3) and to calculate the fuel vaporization ratio Rkk at the time of ignition for a case in which the fuel is injected while the piston 8 is approximately at the intake top dead center position, and the fuel vaporization ratio Rks at the time of ignition for a case in which the fuel is injected while the piston 8 is performing the compression stroke (used in steps Sa5, Sa6, Sa10, and Sa13). Similarly to the flowchart of FIG. 3, the flowchart of FIG. 5 is executed each time the crank angle reference position signal (Ref) is received.

Figure 6:
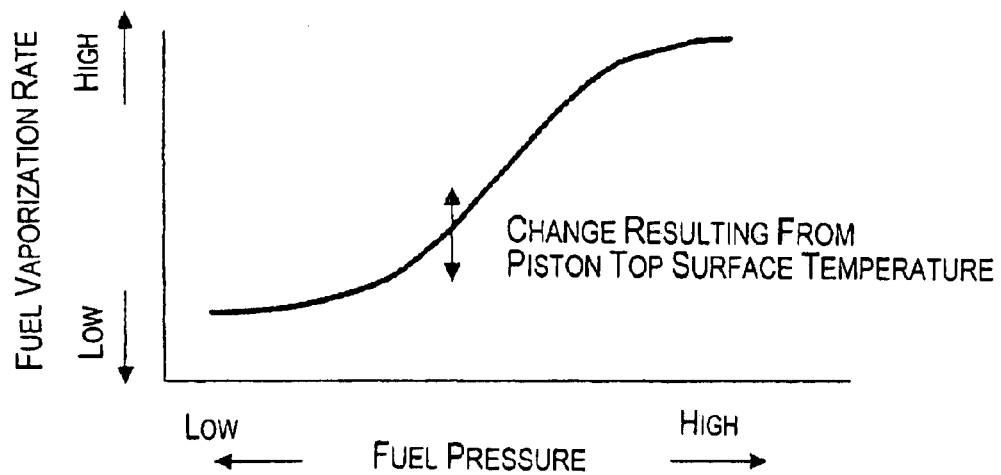
FIG. 6 is a diagrammatic chart illustrating a characteristic curve of a fuel vaporization ratio versus time in accordance with the first embodiment of the present invention.
Figure 7:
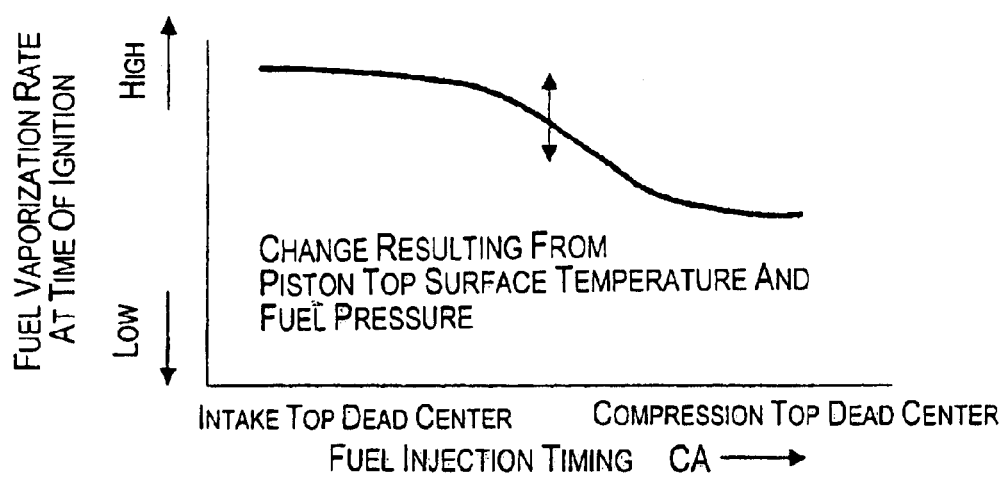
FIG. 7 is a diagrammatic chart illustrating a characteristic curve of the fuel vaporization ratio versus the fuel injection timing in accordance with the first embodiment of the present invention.

In FIG. 6, steps Sd1 (step 1 of the flowchart 'd') to Sd4 serve to determine if stratified combustion can be maintained at the time of combustion if the fuel is injected while the piston 8 is approximately at the intake top dead center position. More specifically, the engine controller 25 is preferably configured to check the following conditions: [1] Is the coolant temperature Tw less than or equal to the prescribed value Ktks (step Sd1)?; [2] Is the number of combustion cycles Cbst performed since the engine was started less than or equal to the prescribed value Kcb (step Sd2)?; [3] Is the fuel pressure Pf less than or equal to the prescribe value Kpf (step Sd3)?; and [4] Is the engine rotational speed Ne less than or equal to the prescribed value Kne (step Sd4)?

When condition [1] is satisfied, the vaporization of the fuel is slow. When condition [2] is satisfied, the vaporization of the fuel is slow because the temperature of the piston cavity 9 is low when the number of combustion cycles Cbst is relatively small. When condition [3] is satisfied, the vaporization of the fuel is slow because the atomization of the fuel stream is poor when the fuel pressure Pf is relatively low. When condition [4] is satisfied, the gas flow movement is low and, consequently, the vaporized fuel can be contained inside the piston cavity 9. Thus, when all four conditions [1] to [4] are satisfied, the engine controller 25 is configured to determine that the vaporized fuel can be contained inside the piston cavity 9 and stratified combustion can be maintained at the time of ignition even if the fuel is injected while the piston 8 is approximately at the intake top dead center position. Although the engine controller 25 is preferably configured to determine if all four conditions are satisfied in the first embodiment of the present invention, it will be apparent to those skilled in the art from this disclosure to simplify the processing by determining if any one of the conditions [1] to [4] is satisfied or if some of the conditions [1] to [4] are satisfied.

Accordingly, when all the conditions [1] to [4] are satisfied in steps Sd1 to Sd4, the engine controller 25 is configured to determine that stratified combustion can be maintained at the time of combustion even if the fuel is injected while the piston 8 is approximately at the intake top dead center position. Thus, the engine controller 25 is configured to proceed to step Sd5. On the other hand, if any one of the conditions [1] to [4] is not satisfied (i.e., if any of steps Sd1 to Sd4 is "No"), then the engine controller 25 is configured to determine that if the fuel is injected while the piston 8 is approximately at the intake top dead center position, the vaporized fuel will not be remained inside the piston cavity 9 and stratified combustion will not be performed at the time of ignition. Thus, the engine controller 25 is configured to proceed to step Sd13. In step Sd13, the engine controller 25 is configured to prohibit fuel injection while the piston 8 is approximately at the intake top dead center position by setting the intake stratified permission flag FKS to 0.

In steps Sd5 to Sd8, the fuel vaporization ratio at the time of ignition is estimated. The rate at which the fuel injected into the piston cavity 9 vaporizes is affected by the temperature of the piston cavity 9. In step Sd5, the engine controller 25 is configured to estimate the temperature of the piston cavity 9. Since it is difficult to measure an actual temperature of the piston cavity 9 directly, the temperature of the piston cavity 9 is estimated based on the coolant temperature Tw and the number of combustion cycles Cbst since the engine was started. It is assumed that the temperature of the piston cavity 9 and the temperature Tw of the coolant are approximately the same before combustion begins. Then, the temperature of the piston cavity 9 rises faster than or at the same rate as the temperature Tw of the coolant rises as the combustion proceeds. Thus, a temperature rise amount referenced from the coolant temperature Tw is calculated based on the number of combustion cycles Cbst performed since the engine was started. Then, the calculated temperature rise amount is added to the coolant temperature Tw to obtain an estimated piston cavity temperature Tpc as seen in a diagram in step Sd5.

As the fuel pressure Pf increases, the atomization of the fuel is promoted and the rate at which the fuel vaporizes increases. For example, FIG. 6 shows the relationship between the fuel pressure and the fuel vaporization ratio. Therefore, in step Sd6, the engine controller 25 is configured to find a fuel pressure vaporization correction rate Rkpf corresponding to the fuel pressure Pf.

In step Sd7, a vaporization time Tk or an amount of time from when the fuel is injected until when the fuel is ignited is calculated. More specifically, the engine controller 25 is configured to calculate a vaporization time Tkk for a case in which the fuel is injected while the piston 8 is approximately at the intake top dead center position and a vaporization time Tks for a case in which the fuel is injected during the compression stroke using the following equations (8) and (9).

$$Tkk = CAk/(Ne \times Kca) \quad (8)$$

$$Tks = CAs/(Ne \times Kca) \quad (9)$$

In the equation (8), CAk is the crank angle (a fixed value) through which the crankshaft turns during the period from the time of fuel injection to the time of ignition for a case in which the fuel is injected while the piston 8 is approximately at the intake top dead center position. In the equation (9), CAs is the crank angle (a fixed value) through which the crankshaft turns during the period from the time of fuel injection to the time of ignition for a case in which the fuel is injected during the compression stroke. In the equations (8) and (9), Kca is a constant designed to make the units match.

Figure 8:
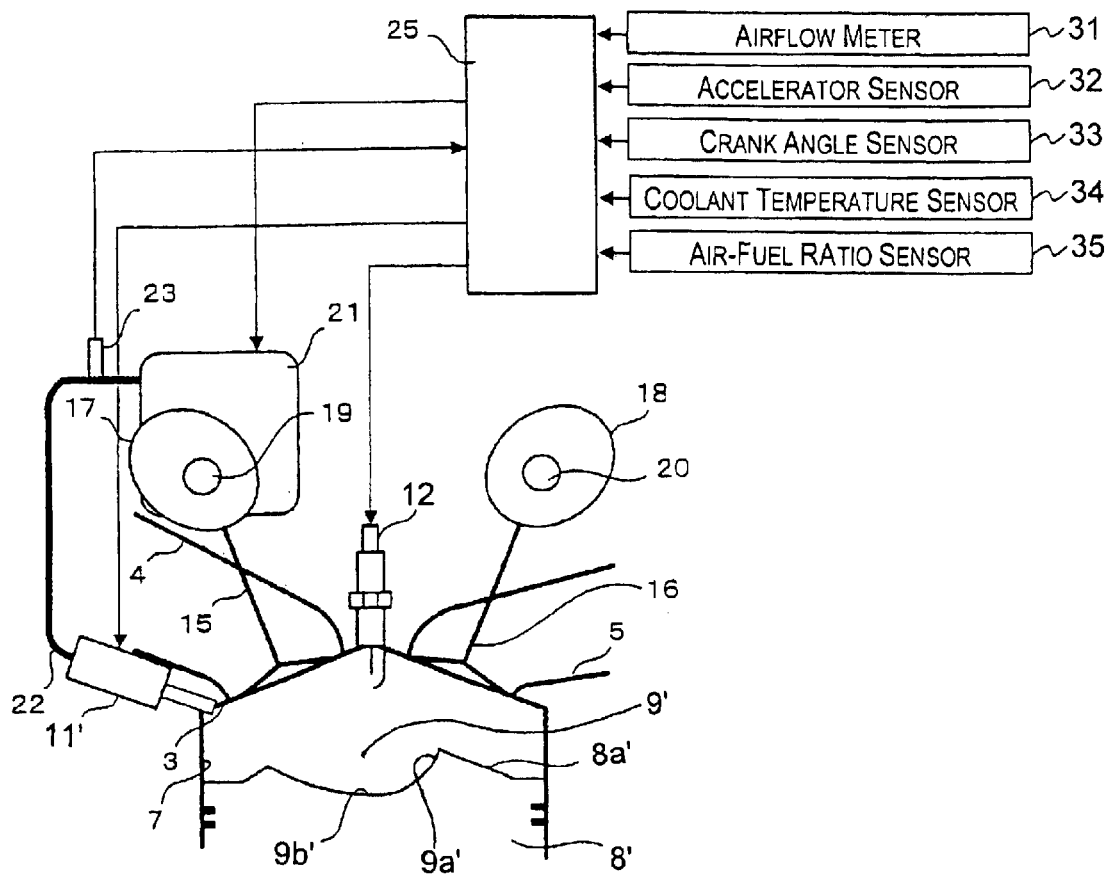
FIG. 8 is a schematic partial cross sectional view of an injection portion of a direct fuel combustion engine utilizing a fuel injection control device in accordance with a second embodiment of the present invention.

In step Sd8, the engine controller 25 is configured to calculate the fuel vaporization ratio Rkk at the time of ignition for a case in which the fuel is injected while the piston 8 is approximately at the intake top dead center position, and the fuel vaporization ratio Rks at the time of ignition for a case in which the fuel is injected during the compression stroke based on the estimated piston cavity temperature Tpc, the vaporization time Tk (Tkk and Tks) and the fuel pressure vaporization correction rate Rkpf. For example, the fuel vaporization ratio Rkk or Rks corresponding to a reference fuel pressure is found using a map based on the estimated piston cavity temperature Tpc and the vaporization time Tk (Tkk or Tks). Then the fuel vaporization ratio Rkk or Rks obtained is multiplied by the fuel pressure vaporization correction rate Rkpf. The fuel pressure vaporization correction rate Rkpf is a value used to calculate the fuel vaporization ratio Rkk or Rks when the fuel pressure is different from the reference fuel pressure. FIG. 8 shows a plot of the fuel vaporization ratio at the time of ignition versus the fuel injection timing. As the plot indicates, the fuel vaporization ratio is higher for when the fuel is injected while the piston 8 is approximately at the intake top dead center position than when the fuel is injected during the compression stroke.

The calculated fuel vaporization ratios Rkk and Rks are stored in the memory of the engine controller 25 and used in steps Sa5, Sa6, Sa7, Sa10, and Sa13 of the flowchart of FIG. 3.

In step Sd9, the engine controller 25 is configured to compare a prescribed value Krk to the fuel vaporization ratio Rkk at the time of ignition for a case in which the fuel is injected while the piston 8 is approximately at the intake top dead center position. If the fuel vaporization ratio Rkk is larger than the prescribed value Krk, the engine controller 25 is configured to determine that the vaporized fuel will not be remained inside the piston cavity 9 if the fuel is injected while the piston 8 is approximately at the intake top dead center position, and thus, stratified combustion cannot be performed at the time of ignition. Therefore, the engine controller 25 is configured to proceed to step Sd13, and set the intake stratified permission flag FKS to 0. In such a case, the fuel is injected during the compression stroke.

If the fuel vaporization ratio Rkk is equal to or less than the prescribed value Krk, the engine controller 25 determines that the vaporization of the fuel is slow. Thus, the engine controller 25 is configured to determine the vaporized fuel can be contained inside the piston cavity 9 and stratified combustion can be maintained at the time of ignition even if the fuel is injected while the piston 8 is approximately at the intake top dead center position. Therefore, the engine controller 25 is configured to proceed to step Sd10. Accordingly, in the first embodiment of the present invention, the engine controller 25 is provided with a means of estimating the fuel vaporization ratio Rkk at the time of ignition for a case in which the fuel is injected while the piston 8 is approximately at the intake top dead center position and the engine controller 25 can determine in step Sa9 whether or not stratified combustion can be maintained at the time of ignition if the fuel is injected while the piston 8 is approximately at the intake top dead center position. Thus, steps Sd1 to Sd3 can be omitted.

Accordingly, the fuel vaporization ratio used in step Sd10 is the fuel vaporization ratio Rkk at the time of ignition for a case in which the fuel is injected while the piston 8 is approximately at the intake top dead center position at such a timing that majority of the injected fuel enters the piston cavity 9. In step Sd10, this fuel vaporization ratio Rkk is compared with a prescribed value Krks. If the fuel vaporization ratio Rkk is larger than the prescribed value Krks, the engine controller 25 is configured to determine the amount of vaporized fuel that will diffuse to the outside of the piston cavity 9 and fail to contribute to the stratified combustion at the time of ignition is increasing. Thus, it is necessary to revise (increase) the quantity of fuel injected to compensate for the portion of vaporized fuel lost by diffusion. Therefore, the engine controller 25 is configured to proceed to step Sd11. In step Sd11, the engine controller 25 is configured to compare the revised (increased) fuel injection amount to the fuel injection amount corresponding to a case in which the fuel is injected during the compression stroke at the timing that substantially the majority of the injected fuel enters the piston cavity 9. The engine controller 25 is then configured to set the intake stratified permission flag FKS to the appropriate value for executing the fuel injection pattern (top dead center of intake stroke or compression stroke) that has the smaller fuel injection amount.

In order to calculate the fuel injection duration in step Sd11 for a case in which the fuel is injected while the piston 8 is approximately at the intake top dead center position, the fuel injection duration corresponding to the quantity of fuel that does not vaporize is first calculated by dividing the unrevised fuel injection duration Ti by the fuel vaporization ratio Rkk at the time of ignition for a case in which the fuel is injected while the piston 8 is approximately at the intake top dead center position. The result is added to the fuel injection duration corresponding to the quantity of fuel that vaporizes and diffuses to the outside of the piston cavity. More specifically, the engine controller 25 is configured to determine that the diffusion of vaporized fuel to the outside of the piston cavity 9 can be ignored until the fuel vaporization ratio Rkk reaches a prescribed value Krks. However, when the engine controller 25 determines that a portion vaporizes at a ratio equal to the amount by which Rkk exceeds Krks (Rkk−Krks), the engine controller 25 is configured to calculate the fuel injection duration corresponding to the amount of fuel that diffuses to the outside of the piston cavity 9 by dividing the fuel injection duration Ti by (Rkk−Krks). Thus, the fuel injection duration for a case in which the fuel is injected while the piston 8 is approximately at the intake top dead center position is calculated as follows: Ti/Rkk+Ti/(Rkk−Krks).

Next, the fuel injection duration for a case in which the fuel is injected during the compression stroke is calculated using the fuel vaporization ratio Rks as follows: Ti/Rks. Thus, the value Ti/Rkk+Ti/(Rkk−Krks) is compared to the value Ti/Rks. Since the fuel injection duration Ti is the same throughout the routine, the fuel injection duration Ti is omitted and the value 1/Rkk+1/(Rkk−Krks) is compared to the value 1/Rks in step Sd11. If 1/Rkk+1/(Rkk−Krks) is less than 1/Rks, the engine controller 25 is configured to determine that the fuel injection amount will be smaller if the fuel is injected while the piston 8 is approximately at the intake top dead center position and proceed to step Sd12. In step Sd12, the engine controller 25 is configured to set the intake stratified permission flag FKS to 1 so that the fuel is injected while the piston 8 is approximately at the intake top dead center position. In such a case, the fuel injection duration is revised according to the previously described step Sa6 of FIG. 3.

On the other hand, if 1/Rkk+1/(Rkk−Krks) equal to or greater than 1/Rks in step Sd11, the engine controller 25 is configured to determine that the fuel injection amount will be smaller if the fuel is injected during the compression stroke and proceed from step Sd11 to step Sd13. In step Sd13, the engine controller 25 is configured to set the intake stratified permission flag FKS to 0 and execute the fuel injection during the compression stroke.

By setting the fuel injection timing so as to achieve a smaller fuel injection amount, the fuel consumption and HC emissions can be reduced.

If the fuel vaporization ratio Rkk is equal to or less than the prescribed value Krks in step Sd10, then the diffusion of vaporized fuel to the outside of the piston cavity 9 can be ignored. Thus, the engine controller 25 is configured to skip step Sd11 and proceed directly to step Sd12. As mentioned above, the engine controller 25 is configured to set the intake stratified permission flag FKS to 1 in step Sd12 so that the fuel is injected while the piston 8 is approximately at the intake top dead center position is permitted.

Accordingly, in the first embodiment of the present invention, the fuel is injected such that substantially the majority of the injected fuel enters the piston cavity 9 when the temperature of the engine is relatively low after the engine is first started. As a result, the fuel injected from the fuel injection valve 11 can be prevented from sticking directly to the wall surface of the cylinder 7. Moreover, even if the fuel vaporizes, the piston cavity 9 is arranged to suppress diffusion of the vaporized fuel to the outside of the piston cavity 9 and hold the amount of vaporized fuel that sticks to the wall surface of the cylinder 7 to a minimum. Also, injecting the fuel while the piston 8 is approximately at the intake top dead center position provides more fuel vaporization time between fuel injection and ignition as shown in FIG. 8.

As a result, particularly during cold starting of the engine, sticking of fuel to the wall surface of the cylinder 7 and the need to inject an extra fuel to compensate for insufficient vaporization can be held to a minimum. Additionally, the amount of HC emissions discharged during cold starting can be reduced and the fuel economy can be improved.

The first embodiment of the present invention is also configured such that the fuel injection valve 11 is arranged at the approximate center of the ceiling of the combustion chamber 3 and the piston cavity 9 is shaped such that the center axis of the piston cavity 9 is substantially coaxial with the center axis of the fuel stream sprayed from the fuel injection valve 11. In other words, the piston cavity 9 is arranged such that the space inside the piston cavity 9 is not easily disturbed by gas flow movements in the combustion chamber 3. Thus, even if the fuel injected into the piston cavity 9 vaporizes, the vaporized fuel is remained inside the piston cavity 9 and diffusion of the vaporized fuel to the outside of the piston cavity 9 is suppressed. Particularly when the engine is first started, the engine rotational speed is low and there is little gas flow movement. Under such condition, the vaporization of the fuel is slow because the temperature of the piston cavity 9 is low. Consequently, there is little diffusion of vaporized fuel to the outside of the piston cavity 9 and stratified combustion is maintained at the time of ignition if the fuel is injected when the piston 8 is approximately at the intake top dead center position. In such a case, there is almost no fuel on the quench portions of the wall surface of the combustion chamber 3. As a result, HC emissions are reduced.

This arrangement of the fuel injection valve 11 and the piston cavity 9 provide a relatively wide crank angle range within which the fuel injection timing can be set such that substantially the majority of the injected fuel enters the piston cavity 9. This structure is also effective at preventing diffusion of the fuel that vaporizes inside the piston cavity 9.

The fuel that is injected into the piston cavity 9 while the piston 8 is approximately at the intake top dead center position vaporizes over time while the position of the piston 8 changes. Although the piston cavity 9 is shaped and arranged to suppress diffusion of the vaporized fuel, when the fuel vaporization ratio Rkk becomes relatively high, the amount of vaporized fuel that diffuses to the outside of the piston cavity 9 increases. In such a case, stratified combustion cannot be maintained at the time of ignition. With the first embodiment of the present invention, the fuel injection performed while the piston 8 is approximately at the intake top dead center position at such a timing that substantially the majority of fuel enters the piston cavity 9 is continued so long as not much fuel diffuses from the piston cavity 9 and stratified combustion can be maintained (steps Sa4 to Sa9 of FIG. 3). Thus, HC emissions can be reduced and the fuel economy during cold starting can be steadily improved.

Since the vaporization ratio of the fuel inside the combustion chamber 3 changes according to the coolant temperature (engine temperature), the first embodiment utilizes the coolant temperature Tw to determine whether or not stratified combustion can be maintained at the time of ignition when the fuel is injected while the piston 8 is approximately at the intake top dead center position. Also, as the temperature inside the combustion chamber 3 increases with each combustion cycle after the engine is started, the fuel vaporization ratio increases. Therefore, the first embodiment utilizes the number of combustion cycles Cbst performed since the engine was started to determine whether or not stratified combustion can be maintained at the time of ignition when the fuel is injected while the piston 8 is approximately at the intake top dead center position.

When the engine is first started, the fuel pump 21 is not operating at full capacity and the fuel pressure is relatively low. Thus, the particle size of the fuel stream injected from the fuel injection valve 11 is relatively large and the vaporization ratio of the fuel is relatively low. While the pattern of increase in the fuel pressure and the fuel vaporization ratio depends on the characteristics of the fuel pump 21 and the fuel injection valve 11, substantially the fuel pressure gradually increases after the engine is started and the vaporization ratio increases as the fuel stream becomes more atomized. Accordingly, the first embodiment also utilizes the fuel pressure Pf to determine whether or not stratified combustion can be maintained at the time of ignition when the fuel is injected while the piston 8 is approximately at the intake top dead center position.

Moreover, the gas flow inside the combustion chamber 3 changes with the engine rotational speed. As the gas flow increases, the diffusion of vaporized fuel to the outside of the piston cavity 9 increases and, as a result, maintaining stratified combustion at the time of ignition becomes difficult when the fuel is injected while the piston 8 is approximately at the intake top dead center position. Therefore, the first embodiment also uses the engine rotational speed Ne to determine whether or not stratified combustion can be maintained at the time of ignition when the fuel is injected while the piston 8 is approximately at the intake top dead center position.

Thus, the determination of whether or not stratified combustion can be maintained at the time of ignition when the fuel is injected while the piston 8 is approximately at the intake top dead center position can be accomplished in a simple manner based on the coolant temperature Tw, the number of combustion cycles Cbst performed since the engine was started, the fuel pressure Pf, and the engine rotational speed Ne (steps Sd1 to Sd4 of FIG. 6).

More specifically, with the first embodiment of the present invention, the engine controller 25 is configured to determine stratified combustion cannot be maintained at the time of ignition when the fuel is injected while the piston 8 is approximately at the intake top dead center position when any one of the coolant temperature Tw, the number of combustion cycles Cbst performed since the engine was started, the engine rotational speed Ne, and the fuel pressure Pf is not satisfied (steps Sd1 to Sd4 of FIG. 6). Thus, the determination can be accomplished with even greater precision. Of course, it will be apparent to those skilled in the art from this disclosure that the fuel injection control device can be configured to utilize only one of or some of the coolant temperature Tw, the number of combustion cycles Cbst performed since the engine was started, the fuel pressure Pf, and the engine rotational speed Ne to determine whether stratified combustion can be maintained at the time of ignition when the fuel is injected while the piston 8 is approximately at the intake top dead center position.

With the first embodiment of the present invention, when it is determined that stratified combustion cannot be maintained at the time of ignition, the fuel is injected from the fuel injection valve 11 during the compression stroke at the timing that substantially the majority of fuel enters the piston cavity 9 (steps Sa3, Sa4, and Sa12 of FIG. 3). As a result, sticking of fuel to the wall surface of the cylinder 7 can be minimized. Accordingly, the production of HCs during cold starting can be reduced.

The first embodiment is configured to estimate the fuel vaporization ratio Rkk at the time of ignition for a case in which the fuel is injected while the piston 8 is approximately at the intake top dead center position and at the timing that substantially the majority of fuel enters the piston cavity 9. When the estimated fuel vaporization ratio Rkk is high and the amount of fuel that does not contribute to combustion has increased due to the diffusion of vaporized fuel to the outside of the piston cavity 9, the fuel injection duration (Ti/Rkk+Ti/(Rkk−Krks)) is revised so as to increase the fuel injection amount by an amount of fuel equal to the amount of fuel that does not contribute to the combustion. Then, the engine controller 25 is configured to determine whether the revised fuel injection duration is smaller than the fuel injection duration (Ti/Rks) for a case in which the fuel is injected during the compression stroke at the timing that substantially the majority of fuel enters the piston cavity 9.

Then, if the fuel injection duration during the compression stroke is smaller than the revised fuel injection duration, the engine controller 25 is configured to switch to fuel injection during the compression stroke at the timing that substantially the majority of fuel enters the piston cavity 9 (steps Sd10, Sd11, and Sd13 of FIG. 6 and steps Sa4 and Sa12 of FIG. 3). As a result, excess fuel injection can be reduced even further.

Since the fuel vaporization ratios are different for the two fuel injection patterns (i.e., during the intake stroke and during the compression stroke), a sudden change in torque occurs when the engine controller 25 switches between a first fuel injection timing where the fuel is injected while the piston 8 is approximately at the intake top dead center position such that substantially the majority of fuel enters the piston cavity 9, and a second fuel injection timing where the fuel is injected while the piston 8 is performing the compression stroke such that substantially the majority of fuel enters the piston cavity 9. Therefore, the engine controller 25 is configured to estimate the fuel vaporization ratio Rks at the time of ignition for a case in which the fuel is injected during the compression stroke at such a timing that substantially the majority of fuel enters the piston cavity 9. When the engine controller 25 switches to fuel injection during the compression stroke at the timing that substantially the majority of fuel enters the piston cavity 9, the fuel injection duration Ti is revised based on the fuel vaporization ratio Rks (step Sa13 of FIG. 3). As a result, the sudden change in torque can be alleviated.

When the engine controller 25 determines a portion of the fuel will deviate from the piston cavity 9 if a total fuel injection amount is injected while the piston 8 is approximately at the intake top dead center position at the timing that substantially the majority of fuel enters the piston cavity 9, the engine controller 25 is configured to perform a divided fuel injection timings. More specifically, an amount of fuel excluding the deviant fuel from the total fuel injection amount is injected while the piston 8 is approximately at the intake top dead center position and an amount of fuel corresponding to the deviant fuel is injected during the compression stroke at the timing that approximately the majority of fuel enters the piston cavity (steps Sa8, Sa10, Sa11 of FIG. 3). As a result, sticking of the fuel to the wall surface of the cylinder 7 can be avoided even when a portion of the fuel would deviate from the piston cavity 9 if the total fuel injection amount was injected while the piston 8 is approximately at the intake top dead center position at the timing that substantially the majority of fuel enters the piston cavity 9.

The fuel vaporization ratio (Rkk or Rks) of the fuel injected from the fuel injection valve 11 at the time of ignition varies depending on the coolant temperature (engine temperature), the amount of time from fuel injection until ignition, and the atomization of the fuel. Thus, the engine controller 25 is configured to estimate the fuel vaporization ratio (Rkk or (Rks) based on any one or a plurality of the coolant temperature Tw, the engine rotational speed Ne, the number of combustion cycles Cbst, and the fuel pressure Pf. However, it will be apparent to those skilled in the art from this disclosure that the fuel injection control device can be configured and arranged to simplify the estimation method by omitting parameters whose contribution to the fuel vaporization ratio is small depending on the engine characteristics.

Second Embodiment

Referring now to FIG. 8, a fuel injection control device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

The second embodiment of the present invention is identical to the first embodiment except for the arrangements of a fuel injection valve 11' and a piston cavity 9' of a piston 8'. More specifically, in the second embodiment of the present invention, the fuel injection valve 11' is installed near the lowest edge of the combustion chamber 3 at a prescribed angle with respect to a center axis of the piston 8' and the piston cavity 9' has a descending form to received the fuel stream injected from the fuel injection valve 11'. Thus, the fuel is injected diagonally rightward and downward of FIG. 2 toward the descending piston cavity 9' when the piston 8' is approximately at the intake top dead center position. The injected fuel follows along the shape of the cavity 9' and curls into a round form. Thus, the injected fuel is substantially held inside the cavity 9'. The vaporized fuel formed inside the cavity 9' during this process is pushed upward by the piston 8' and ignited by the spark plug 12 installed on the ceiling of the combustion chamber when the fuel reaches the spark plug 12. The effect of the present invention is greater in the arrangement of the first embodiment shown in FIG. 1 than the arrangement of the second embodiment shown in FIG. 8 since the first embodiment provides a relatively wider time window within which the fuel can be injected at such a timing that substantially the majority of the injected fuel enters the piston cavity 9. However, the arrangement of the second embodiment shown in FIG. 8 can be also utilized to sufficiently carry out the present invention.

Third Embodiment

Referring now to FIGS. 9 to 14, a fuel injection control device in accordance with a third embodiment will now be explained. In view of the similarity between the first, second and third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity. The parts of the third embodiment that differ from the parts of the first and second embodiments will be indicated with a prime (') or a double prime (").

Figure 9:
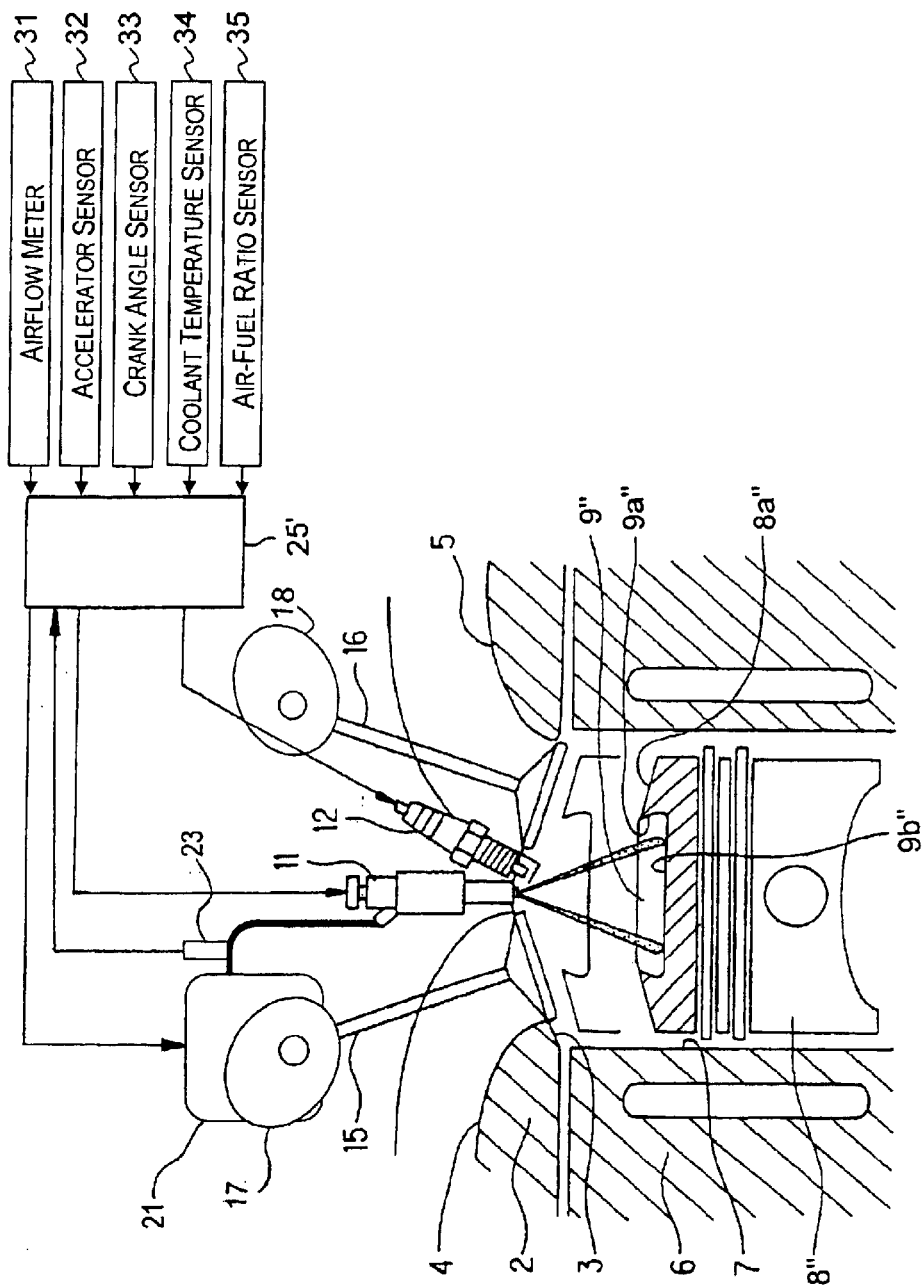
FIG. 9 is a schematic partial cross sectional view of an injection portion of a direct fuel combustion engine utilizing a fuel injection control device in accordance with a third embodiment of the present invention.

FIG. 9 is a schematic partial cross sectional view of an injection portion of a direct fuel combustion engine utilizing a fuel injection control device in accordance with a third embodiment of the present invention. As shown in FIG. 9, the cylinder head 2 forms a pent-roof-shaped combustion chamber 3 having a roof that slants substantially equally to the left and right. On the left and right sides, respectively, of the roof are provided the air intake port 4 for introducing air and the exhaust port 5 for discharging post-combustion gases. The cylinder 7, which is oriented vertically in the figure, is provided in the cylinder block 6. A piston 8" slides up and down inside the cylinder 7. The intake valve 15 and the exhaust valve 16 open and close the intake and exhaust ports 4 and 5, respectively in accordance with the motion of the piston 8". The intake and exhaust cams 17 and 18 configured to press the intake and exhaust valves 15 and 16, respectively, downwardly against springs are fixed to engine-driven camshafts.

Similarly to the first embodiment described above, in the third embodiment of the present invention, the positioning of the fuel injection valve 11 and spark plug 12 and the shape of a cavity 9" formed in the top surface of the piston 8" are contrived to facilitate stable stratified combustion even when the fuel pressure is below a prescribed value. The fuel injection valve 11 is arranged at the substantially upper center position of the roof of the combustion chamber 3 such that a center axis of the fuel stream is directed vertically downward into the combustion chamber 3. The spark plug 12 is provided to substantially adjacent to the fuel injection valve 11. The fuel injection valve 11 is configured to discharge a fuel stream that is shaped substantially a hollow circular cone. More specifically, the fuel injection valve 11 is preferably configured to inject the substantially hollow circular cone shape fuel stream in which a vertical component of the penetration force of the fuel stream is larger than the horizontal component.

In the third embodiment of the present invention, the cavity 9" formed in the substantially center portion of a top surface 8a" of the piston 8" is shaped like a truncated circular cone. The cavity 9" has a peripheral wall surface 9a shaped like the side surface of the truncated circular cone. The cavity 9" includes a bottom wall surface 9b" that is smoothly connected with the peripheral wall surface 9a" of the cavity 9".

The fuel injection valve 11 is configured to inject the fuel in a substantially hollow circular cone shape from an upper part of the combustion chamber 3. In the third embodiment of the present invention, when the fuel pressure Pf is below a prescribed value LPf, an engine controller 25' is configured to perform stratified combustion by executing a divided fuel injection timing in which fuel injection valve 11 injects a fuel stream once during the intake stroke when the piston 8" is near the intake top dead center position and again during the compression stroke. When the fuel pressure Pf reaches or exceeds the prescribed value LPf, the engine controller 25' is configured to perform stratified combustion by injecting the fuel during the compression stroke in the conventional manner.

A certain fuel pressure is required to inject the fuel directly into the combustion chamber 3 from the fuel injection valve 11. Therefore, the high-pressure fuel pump 21 driven by the intake valve camshaft 19 is arranged to deliver pressurized fuel to the fuel injection valve 11 through a high-pressure fuel line. The fuel pressure sensor 23 provided in the high-pressure fuel line 22 is configured to send a signal to the engine controller 25'. Since the required fuel pressure varies according to the engine operating conditions, the engine controller 25' is configured to control the operation of the high-pressure fuel pump 21 such that the actual fuel pressure matches the required fuel pressure.

Similarly to the first embodiment, the engine controller 25' is configured to receive signals from the airflow meter 31, the crank angle sensor 33, and the coolant temperature sensor 34. The engine controller 25' is configured to control the fuel injection of the fuel injection valve 11 and the ignition timing of the spark plug 12 such that stratified combustion is performed regardless of the fuel pressure level. The engine controller 25' is also configured to receive a signal from the accelerator sensor 32 and control the opening of an electronically controlled throttle valve in such a manner as to obtain the optimum torque based on the accelerator position and the engine rotational speed.

Figure 10:
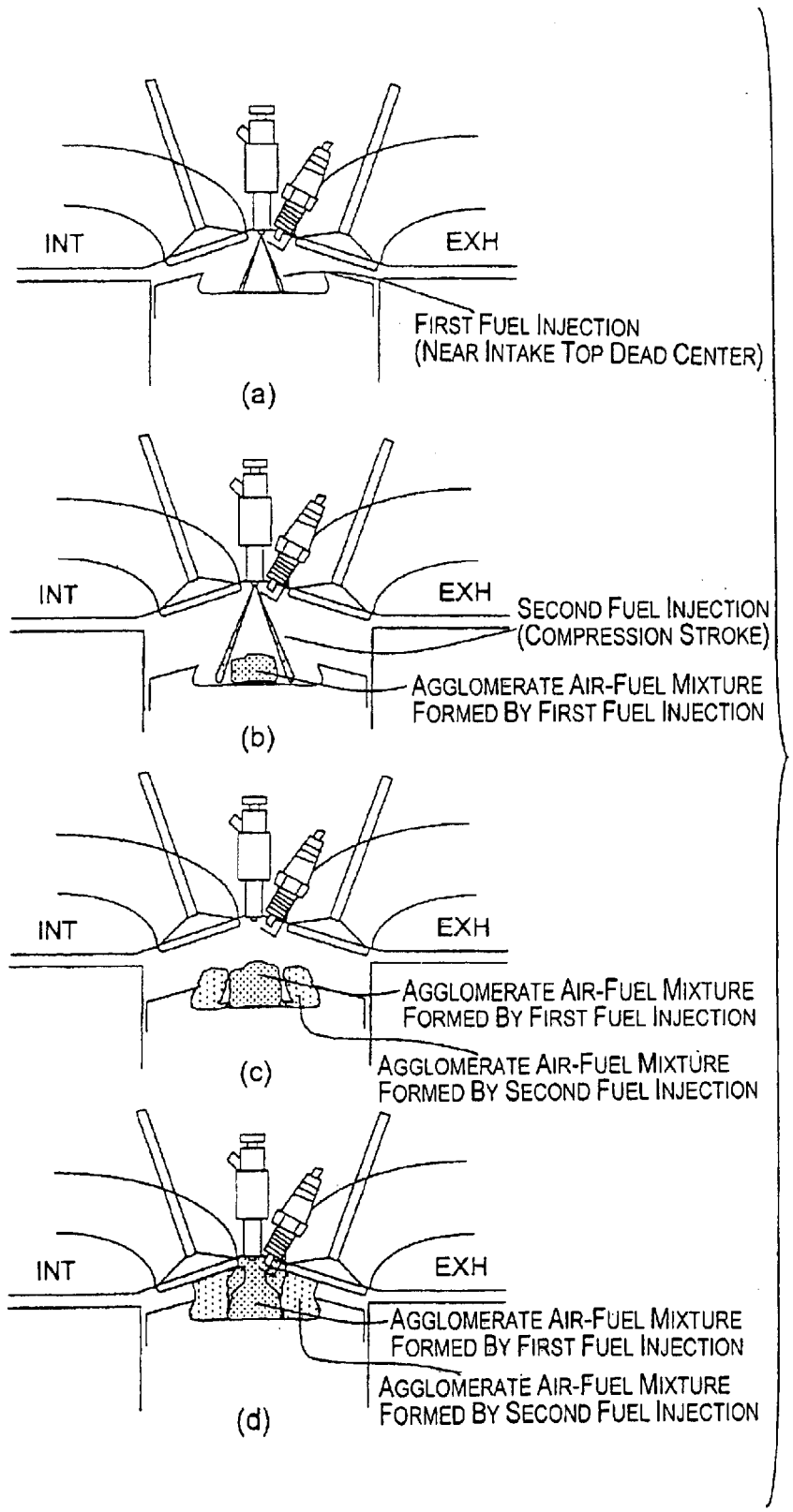
FIG. 10 is diagrammatic cross sectional views of the combustion chamber shown in FIG. 9 illustrating distribution of the air-fuel mixture in the combustion chamber in accordance with the third embodiment of the present invention.

FIG. 10 illustrates distribution of the air-fuel mixture in the combustion chamber 3 for performing stratified combustion when the fuel pressure Pf is below the prescribed value LPf. The each of the diagrams (a) to (d) in FIG. 10 illustrates each stage in the development of the agglomerate stratified air-fuel mixture. The diagrams (a) to (d) arranged from top to bottom in the order of occurrence. The diagram (a) illustrates the stage when the fuel is injected while the piston 8" is near the intake top dead center position of the intake stroke (first fuel injection). The diagram (b) illustrates the stage when the fuel is injected during the compression stroke (second fuel injection). The diagrams (c) and (d) illustrate successive stages during the compression stroke.

When the fuel pressure Pf is below the prescribed value LPf, a prescribed amount of fuel is injected during the intake stroke while the piston is near the intake top dead center position (at the beginning of the intake stroke) as seen in the diagram (a) of FIG. 10. Since the fuel pressure is relatively low and the piston 8" is close to the fuel injection valve 11 when the piston 8" is near the intake top dead center position, the substantially hollow-circular-cone shaped fuel stream is in a substantially liquid state when the fuel stream reaches the cavity 9" of the piston 8". Thus, the injected fuel adheres to the center portion of the bottom wall surface 9b". The adhered fuel vaporizes during the period from the intake stroke to the time of ignition and forms a first agglomerate air-fuel mixture in the space above the center area of the cavity 9" as seen in the diagram (b) of FIG. 10.

Subsequently to the first fuel injection, the remainder of the fuel is injected during the compression stroke (second fuel injection or an additional fuel injection) as seen in the diagram (b) of FIG. 10. The timing of the second fuel injection is set such that the substantially hollow circular cone shaped fuel stream arrives at the radially outer periphery of the bottom wall surface 9b" of the cavity 9". The amount of time from the second fuel injection to arrival of the fuel at the bottom wall surface 9b" is longer than the amount of time from the first fuel injection to arrival of the fuel at the bottom wall surface 9b" since the first fuel injection is performed while the piston 8" was near the intake top dead center. Therefore, the fuel injected in the second fuel injection adheres to the radially outer periphery of the bottom wall surface 9b" and vaporizes while spreading away from the center axis of the cavity 9" toward the peripheral wall surface 9a" of the cavity. Therefore, a donut-shaped second agglomerate air-fuel mixture is formed as seen in the diagram (c) of FIG. 10.

The portion of the donut-shaped agglomerate air-fuel mixture corresponding to the donut hole contains little or no fuel because the fuel pressure Pf is lower than the prescribed value LPf and the diffusion of the air-fuel mixture is insufficient. In other words, the air-fuel mixture formed by the second fuel injection does not spread into the donut hole portion. However, the first agglomerate fuel mixture formed in the center portion of the cavity 9" by the first fuel injection serves to fill in the donut hole portion of the donut-shaped second agglomerate air-fuel mixture formed by the second fuel injection as seen in the diagram (d) of FIG. 10. Therefore, a single homogeneous agglomerate air-fuel mixture is formed in the space above the cavity 9" by the time of ignition.

Only a donut-shaped agglomerate air-fuel mixture would be formed if only a single fuel injection during the compression stroke were executed in the conventional manner when the fuel pressure Pf was below the prescribed value LPf. In such a case, if the donut hole portion reached the vicinity of the spark plug 12, failure to ignite the agglomerate air-fuel mixture or misfiring would occur and the combustion stability would decline. Thus, stable stratified combustion is difficult to perform if only a single fuel injection was executed during the compression stroke when the fuel pressure Pf is below the prescribed value LPf. Accordingly, in the third embodiment of the present invention, by executing the first fuel injection during the intake stroke while the piston is near the intake top dead center position, the first agglomerate air-fuel mixture is formed in the vicinity of the center axis of the cavity 9" before the second fuel injection during the compression stroke is executed. This first agglomerate air-fuel mixture fills in the donut hole portion of the donut-shaped second agglomerate air-fuel mixture formed by the second fuel injection during the compression stroke. Thus, the combination of the two air-fuel mixtures is able to form a single homogeneous agglomerate air-fuel mixture. Accordingly, a stable stratified combustion is performed even when the fuel pressure is lower than the prescribed value LPf.

The fuel injection control executed by the engine controller 25' based on the fuel pressure Pf in accordance with the third embodiment of the present invention will now be described using the flowchart shown in FIG. 11.

In step S1, the engine controller 25' is configured to read in the intake air quantity Qa detected by the airflow meter 31, the engine rotational speed Ne detected by the crank angle sensor 33, the fuel pressure Pf detected by the fuel pressure sensor 23, the coolant temperature Tw detected by the coolant temperature sensor 34, and the accelerator position APO detected by the accelerator sensor 32. In step S2, the engine controller 25' finds the target torque TTC based on the accelerator position APO. The target torque TTC can be found by, for example, storing table data allocating the target torque as a function of the accelerator position APO in the memory of the engine controller 25' in advance and referring to the table data based on the accelerator position APO.

In step S3, the target equivalence ratio TFBYA is found based on the engine rotational speed Ne and the target torque TTC. The target equivalence ratio TFBYA can be found, for example, by storing map data allocating the target equivalence ratio TFBYA as a function of the engine speed Ne and target torque TTC in the memory of the engine controller 25' in advance and referring to the map data based on the values of the engine speed Ne and target torque TTC.

In step S4, the engine controller 25' is configured to calculate a basic fuel injection amount or a basic fuel injection quantity Qf0. The basic fuel injection quantity Qf0 is the fuel injection quantity appropriate for stratified combustion with a stoichiometric air-fuel ratio (target equivalence ratio TFBYA=1). The basid fuel injection quantity is calculated using the following equation (10) based on the intake air quantity Qa and the engine rotational speed Ne. In the equation (10), K is a constant.

$$Qf0 = K \times Qa/Ne \qquad (10)$$

In step S5, the engine controller 25' is configured to compare the fuel pressure Pf to the prescribed value LPf. The prescribed value LPf is set to a minimum fuel pressure required to produce a fuel stream whose speed in the injection direction is sufficiently high that a single fuel injection during the compression stroke can form stratified air-fuel mixture in the space above the center portion of the cavity 9" that is substantially homogeneous with no lean portions. The value of LPf is preferably determined in advance experimentally.

If the fuel pressure Pf is equal to or higher than the prescribed value LPf in step S5, the engine controller 25' is configured to proceed to steps S6 to S8 and execute the operations of injecting a single fuel stream during the compression stroke. More specifically, in step S6, the engine controller 25' is configured to set the fuel injection quantity Qfa for injecting during the compression stroke using the following equation (11).

$$Qfa = Qf0 \times TFBYA \times (1+Ktp) \tag{11}$$

In the equation (11), Ktp is a compensation coefficient. The equation (11) is used to revise the basic fuel injection quantity Qf0 with the target equivalence ratio TFBYA and the compensation coefficient Ktp for injecting a single fuel stream during the compression stroke.

Figure 12A:
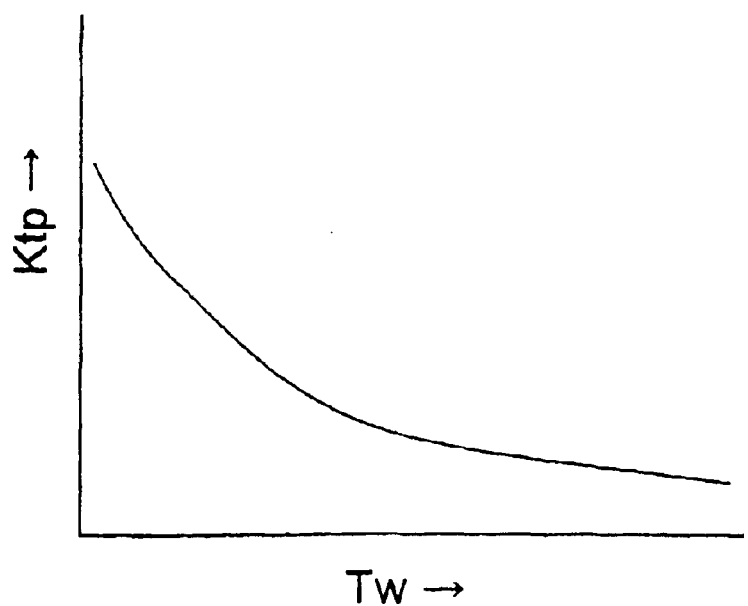
FIG. 12(a) is a simplified characteristic plot of a compensation coefficient for a fuel vaporization ratio with respect to a coolant temperature when a single fuel injection is performed during a compression stroke in accordance with the third embodiment of the present invention.
Figure 12B:
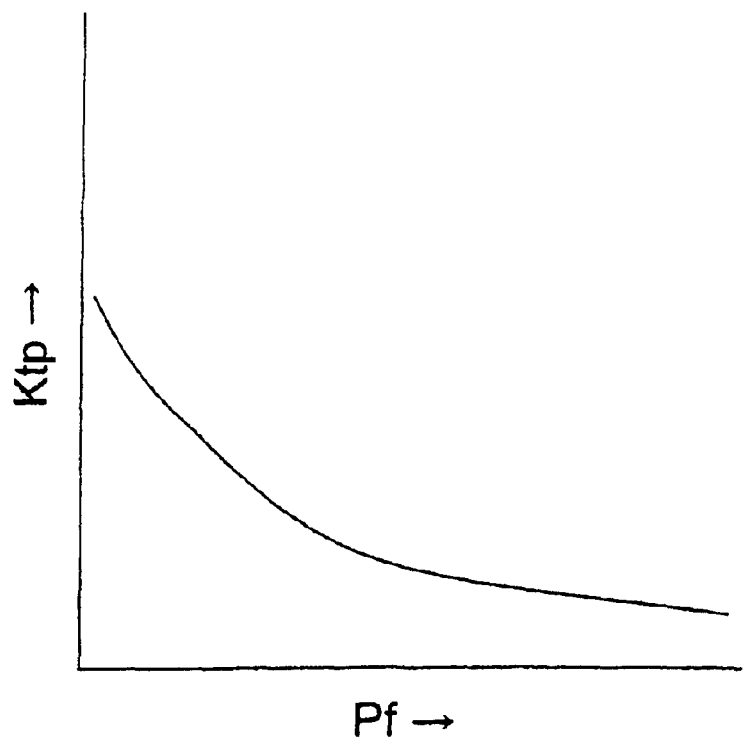
FIG. 12(b) is a simplified characteristic plot of the compensation coefficient for a fuel vaporization ratio with respect to a fuel pressure when a single fuel injection is performed during a compression stroke in accordance with the third embodiment of the present invention.

The compensation coefficient Ktp is set in accordance with the vaporization degree of the injected fuel. Since the vaporization degree of the injected fuel varies depending on the coolant temperature Tw and the fuel pressure Pf, a table data that allocates the compensation coefficients Ktp as a function of the coolant temperature Tw and the fuel pressure Pf is preferably stored in the memory of the engine controller 25'. Thus, the engine controller 25' is preferably configured to find the compensation coefficient Ktp by referring to the map data based on the coolant temperature Tw and the fuel pressure Pf. For example, as shown in FIGS. 12(*a*) and 12(*b*), the map data is preferably set such that the fuel injection quantity Qfa for injecting the fuel stream during the compression stroke increases as the coolant temperature Tw and the fuel pressure Pf decrease.

Figure 11:
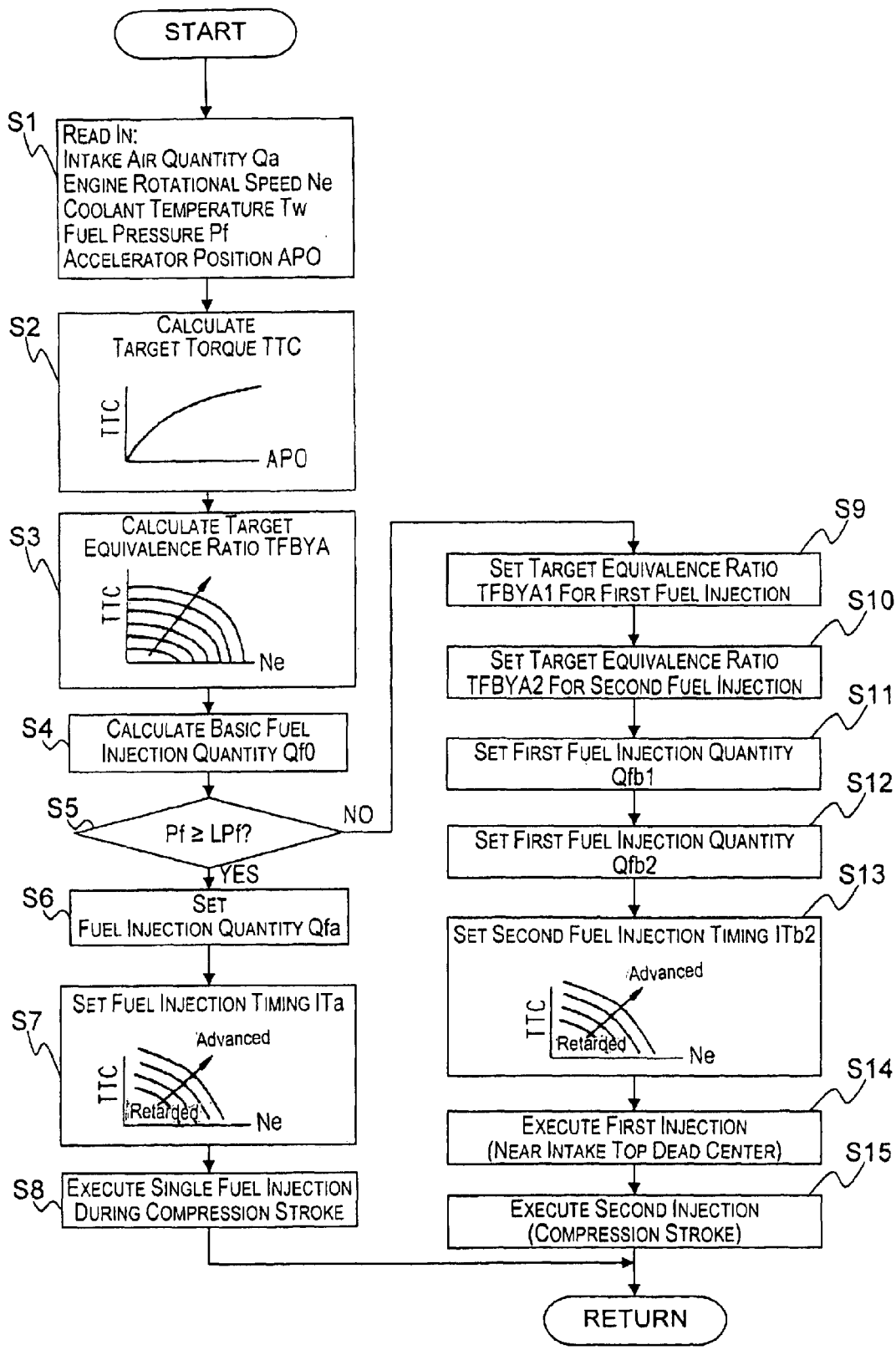
FIG. 11 is a flowchart for explaining a fuel injection control based on a fuel injection pressure in accordance with the third embodiment of the present invention.

In step S7 of FIG. 11, the engine controller 25' is configured to set the fuel injection timing ITa for injecting the fuel stream during the compression stroke in accordance with the engine rotational speed Ne and the target torque TTC. The fuel injection timing ITa is preferably set by, for example, storing map data allocating fuel injection timing ITa as a function of the engine rotational speed Ne and the target torque TTC in the memory of the engine controller 25'. Thus, the engine controller 25' is preferably configured to find the fuel injection timing ITa by referring to the map data based on the values of the engine rotational speed Ne and the target torque TTC.

In step S8, the engine controller 25' uses the fuel injection quantity Qfa and the fuel injection timing ITa to execute a single fuel injection during the compression stroke to perform stratified combustion.

On the other hand, if the fuel pressure Pf is smaller than the prescribed value LPf in step S5, the engine controller 25' is configured to proceed to steps S9 to S15 to execute the operations for performing divided fuel injection tiing. As mentioned above, in the divided fuel injection timing, the fuel is injected once during the intake stroke while the piston 8" is near the intake top dead center position and a second time during the compression stroke. In step S9, the engine controller 25' is configured to set the target equivalence ratio TFBYA1 for the first fuel injection (while piston is near the intake top dead center position). In step S10, the engine controller 25' is configured to set the target equivalence ratio TFBYA2 for the second fuel injection (during the combustion stroke).

The sum of the target equivalence ratios TFBYA1 and TFBYA2 equals the total target equivalence ratio TFBYA found in step S3. In other words, the target equivalence rations TFBYA1 and TFBYA2 and the total target equivalence ratio satisfy the following equation (12).

$$TFBYA = TFBYA1 + TFBYA2 \tag{12}$$

Figure 13:
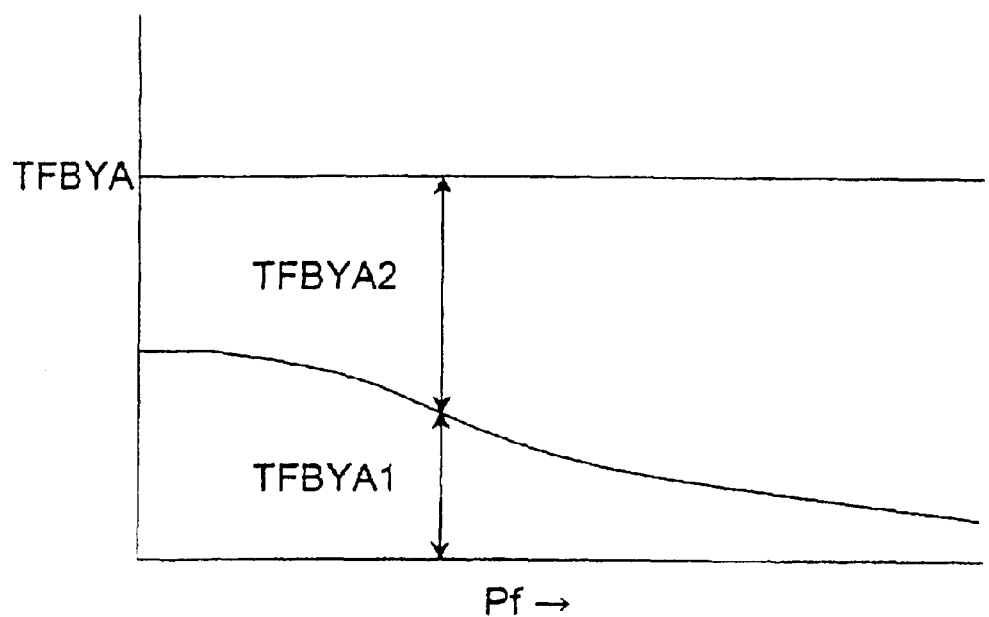
FIG. 13 is a simplified characteristic plot illustrating the relationship of two target equivalence ratios for a divided fuel injection timing with respect to a total target equivalence ratio in accordance with the third embodiment of the present invention.

As seen in FIG. 13, the target equivalence ratio TFBYA1 for the first fuel injection decreases as the fuel pressure increases. Thus, the target equivalence ratio TFBYA2 for the second fuel injection is the value obtained by subtracting the target equivalence ratio TFBYA1 for the first fuel injection from the total target equivalence ratio TFBYA. The characteristic relationships of TFBYA1 and TFBYA2 with respect to the fuel pressure Pf and the total target equivalence ratio TFBYA is preferably found experimentally in advance and stored as map data in the memory of the engine controller 25'. Then, the values of TFBYA1 and TFBYA2 are preferably found by referring to the map data based on the fuel pressure Pf and the target equivalence ratio TFBYA.

In steps S11 and S12, the following equations (13) and (14) are used to calculate the first fuel injection quantity Qfb1 and the second fuel injection quantity Qfb2, respectively.

$$Qfb1 = Qf0 \times TFBYA1(1+Ktp1) \tag{13}$$

$$Qfb2 = Qf0 \times TFBYA2(1+Ktp2) \tag{14}$$

Figure 14A:
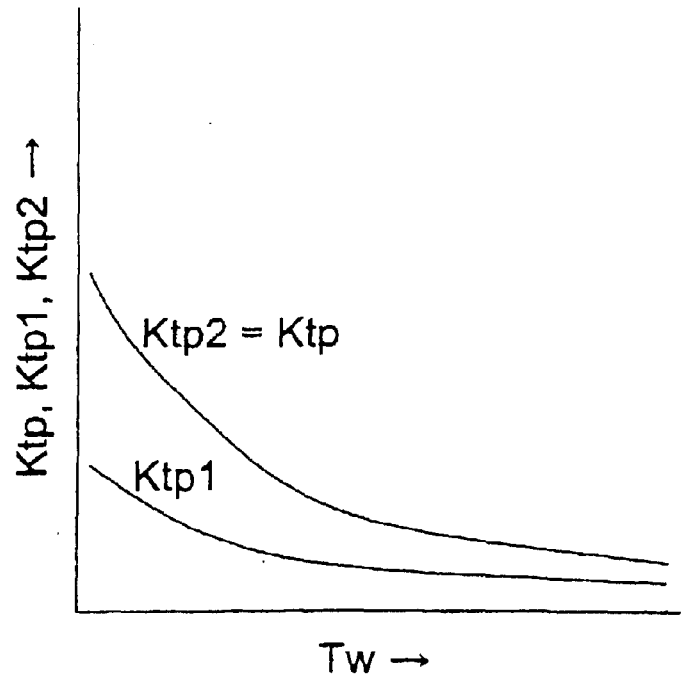
FIG. 14(a) is a simplified characteristic plot of compensation coefficients for the fuel vaporization ratio with respect to the coolant temperature when a divided fuel injection is executed in accordance with the third embodiment of the present invention.

In the equations (13) and (14), Ktp1 and Ktp2 are compensation coefficients. The compensation coefficients Ktp1 and Ktp2 used in equations (13) and (14) are set in accordance with the vaporization degree of the adhered fuel. Since the vaporization degree of the fuel varies depending on the coolant temperature Tw and the fuel pressure Pf, a table is created that allocates the compensation coefficients Ktp1 and Ktp2 as a function of the coolant temperature Tw and the fuel pressure Pf. For example, as shown in FIGS. 14(*a*) and 14(*b*), the map data is set such that the compensation coefficients Ktp1 and Ktp2 increase as the coolant temperature Tw and the fuel pressure Pf decrease so that fuel injection quantities Qfb1 and Qfb2 increase as the coolant temperature Tw and the fuel pressure Pf decrease.

When the first fuel injection of the divided fuel injection timing is executed during the intake stroke while the piston is near the intake top dead center position, there is sufficient time for the fuel adhered on the bottom wall surface 9b" of the cavity 9" to vaporize by the time of ignition. Thus, the fuel inside the combustion chamber 3 vaporizes to a relatively higher degree (i.e., reaches a higher vaporization degree) than when a single fuel injection is injected during the compression stroke under the same conditions. Consequently, the compensation value for the fuel that does not vaporize is smaller than when the fuel is injected with a single fuel injection during the compression stroke. In other words, the two compensation coefficients Ktp1 and Ktp2 used for the divided fuel injection timing are in the following relationship with the compensation coefficient Ktp for a single fuel injection during the compression stroke: Ktp1<Ktp2=Ktp. As a result, the total fuel injection quantity is smaller when a divided fuel injection timing is employed than when a single fuel injection during the compression stroke is employed under the same conditions.

In step S13, the engine controller 25' is configured to set a second divided fuel injection timing ITb2 for the second fuel injection of the divided fuel injection timing in accordance with the engine rotational speed Ne and the target torque TTC.

As mentioned above, the fuel from the first fuel injection adheres in the center area of the cavity 9" and will eventually form a first agglomerate air-fuel mixture in the space above the center portion of the cavity 9". Therefore, the second divided fuel injection timing ITb2 is preferably set such that the fuel stream of the second fuel injection arrives at the radially outer periphery of the bottom wall surface 9b" of the cavity 9".

Since the second fuel injection of the divided fuel injection timing is executed during the compression stroke, the second divided fuel injection timing ITb2 can be found simply by referring to the same map that is used in step S7 to set the fuel injection timing ITa. It is also possible to find the characteristic relationship of the second divided fuel injection timing ITb2 with respect to the engine rotational speed Ne and the target torque TTC experimentally and store the results as a data map in the memory of the engine controller 25', and use the data map to find the second divided fuel injection timing ITb2 based on the engine rotational speed Ne and the target torque TTC.

On the other hand, the first divided divided fuel injection timing ITb1 for the first fuel injection timing of the divided fuel injection timing is set such that the fuel is injected during the intake stroke while the piston 8" is near the intake top dead center position and the injected fuel adheres to the center portion of the bottom wall surface 9b" of the cavity 9". The value of the first divided divided fuel injection timing ITb1 is preferably set based on the value the experiments to confirm that the fuel will adhere to the center portion of the bottom wall surface 9b" of the cavity 9".

In step S14, the engine controller 25' is configured to execute the first fuel injection during the intake stroke while the piston 8" is near the intake top dead center position based on the first fuel injection quantity Qfb1 and the first divided divided fuel injection timing ITb1. Then, in step S15, the engine controller 25' is configured to execute the second fuel injection during the compression stroke based on the second fuel injection quantity Qfb2 and the second divided fuel injection timing ITb2 and perform stratified combustion.

Accordingly, the fuel injection control device of the third embodiment of the present invention performs stable stratified combustion when the fuel pressure Pf is lower than the prescribed value LPf. When the fuel pressure Pf is lower than the prescribed value LPf, the first fuel injection executed during the intake stroke while the piston 8" is near the intake top dead center position. The first fuel injection produces a substantially hollow circular cone shaped fuel stream that adheres to the center area of the bottom wall surface 9b" of the cavity 9". Since there is sufficient time for the adhered fuel to vaporize by the time of ignition, the fuel adhered on the bottom wall surface 9b" vaporizes and forms the first agglomerate air-fuel mixture in the space above the center area of the cavity 9" as seen in the diagrams (b) and (c) of FIG. 10. Subsequently, the second fuel injection is executed during the compression stroke. The second fuel injection forms the second agglomerate air-fuel mixture that is donut-shaped because the fuel pressure Pf is lower than the prescribed value LPf and the air-fuel mixture inside the combustion chamber 3 does not diffuse sufficiently. Although little or no fuel exists in the donut hole portion of the second agglomerate air-fuel mixture formed by the second fuel injection, the first agglomerate air-fuel mixture is arranged to fill in the donut hole portion. Thus, the combination of the first and second air-fuel mixtures form a single stratified agglomerate air-fuel mixture in the space above the cavity 9" that is substantially homogeneous. Therefore, stable stratified combustion is performed.

When the fuel is injected using a single fuel injection during the compression stroke, it is difficult to achieve stratified combustion when the fuel pressure is relatively low because the speed of the fuel stream in the injection direction is slow and only a donut-shaped agglomerate air-fuel mixture is formed inside the combustion chamber 3. In the third embodiment of the present invention, the divided fuel injection timing is executed (steps S5 and S9 to S15 of FIG. 11) when the fuel pressure Pf is lower than the prescribed value LPf. Thus, a stratified air-fuel mixture that is substantially homogeneous is formed in the space above the cavity 9". As a result, stable stratified combustion is conducted even when the fuel pump 21 fails and the fuel pressure Pf does not rise to the pressure setting value. Moreover, with the third embodiment of the present invention, a stable stratified combustion is performed even when the engine shifts from an operating region having a low pressure setting value to an operating region having a high pressure setting value and the fuel pressure Pf cannot rise fast enough to keep up with the change in the pressure setting value or when the engine is first started (cold starting condition).

Figure 14B:
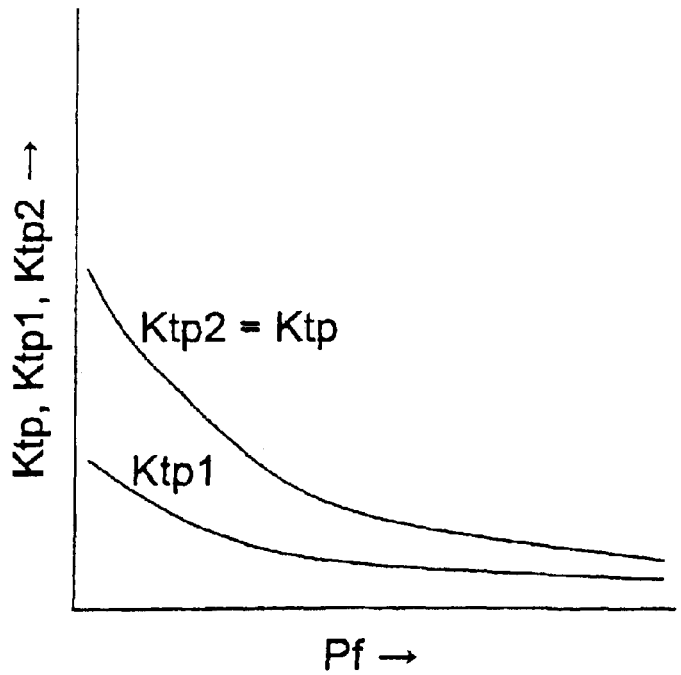
FIG. 14(b) is a simplified characteristic plot of compensation coefficients for the fuel vaporization ratio with respect to the fuel pressure when a divided fuel injection timing is executed in accordance with the third embodiment of the present invention.

When the fuel pressure Pf is below the prescribed value LPf, the speed of the fuel stream in the injection direction increases and the degree of vaporization of the fuel adhered to the bottom wall surface 9b" increases as the fuel pressure Pf rises over time. Consequently, if the same first fuel injection quantity Qfb1 was used when the fuel pressure Pf is low and when the fuel pressure Pf is relatively high, some of the injected fuel would be unnecessary and the amount of unburned HC discharged in the exhaust would probably increase when the fuel pressure Pf is relatively high. Accordingly, in the third embodiment of the present invention, the first fuel injection quantity Qfb1 is reduced by the compensation coefficient Ktp1 as the fuel pressure Pf increases as seen in FIG. 14(b). As a result, the fuel used for conducting stratified combustion is held to a minimum (i.e., the injection of unnecessary fuel can be prevented) amount and the amount of unburned HCs discharged is held to a minimum.

Fourth Embodiment

Referring now to FIGS. 15 to 21, a fuel injection control device in accordance with a fourth embodiment will now be explained. In view of the similarity between the first to third embodiments and the fourth embodiment, the parts of the fourth embodiment that are identical to the parts of the first to third embodiments will be given the same reference numerals as the parts of the first to third embodiments. Moreover, the descriptions of the parts of the fourth embodiment that are identical to the parts of the first to third embodiments may be omitted for the sake of brevity. The parts of the fourth embodiment that differ from the parts of the first to third embodiments will be indicated with a double prime (") or a triple prime ('").

Figure 15:
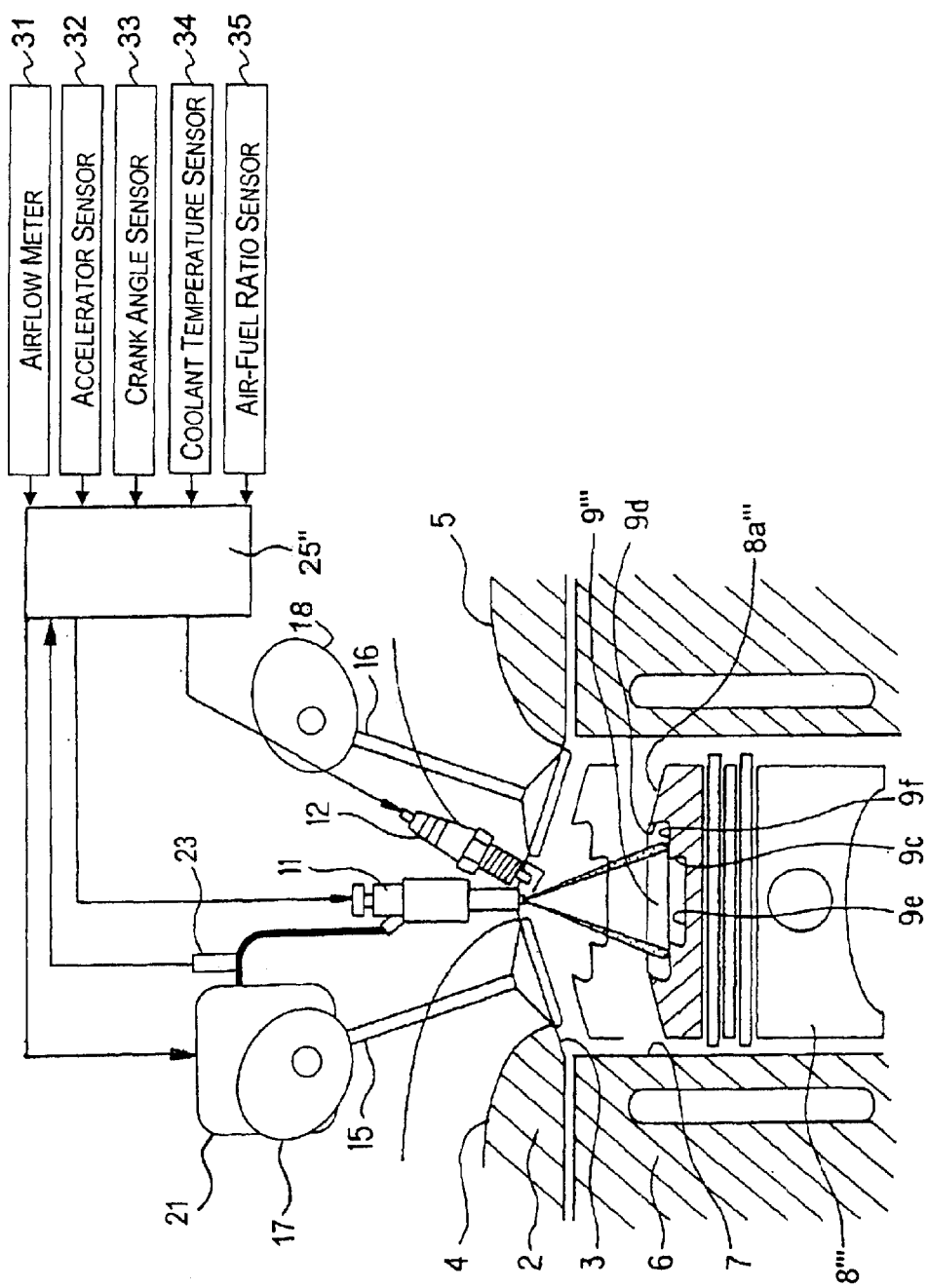
FIG. 15 is a schematic partial cross sectional view of an injection portion of a direct fuel combustion engine utilizing a fuel injection control device in accordance with a fourth embodiment of the present invention.

FIG. 15 is a schematic partial cross sectional view of an injection portion of a direct fuel combustion engine utilizing a fuel injection control device in accordance with a fourth embodiment of the present invention. The direct fuel injection engine used in the fourth embodiment is identical to the direct fuel injection engine used in the third embodiment as explained above except for that a piston 8'" having a cavity 9'" is substituted for the piston 8" having the cavity 9" of the third embodiment. Specifically, the cavity 9'" preferably has a lower cavity and an upper cavity as seen in FIG. 15. More specifically the cavity 9'" is provided with a substantially cylindrical lower peripheral wall surface 9c that surrounds the lower cavity and a substantially cylindrical upper peripheral wall surface 9d that surrounds the upper cavity. The upper peripheral wall surface 9d has a larger diameter than a diameter of the lower peripheral wall surface 9c. The lower cavity has a lower bottom wall surface 9e that is smoothly connected to the lower peripheral wall surface 9c. The upper cavity has a ring-shaped upper bottom wall surface 9f that is substantially parallel to the lower bottom wall surface 9e. The upper bottom wall surface 9f is smoothly connected to the upper peripheral wall surface 9d.

In the fourth embodiment of the present invention, an engine controller 25" is configured to perform stratified combustion by executing the divided fuel injection timing when the combustion chamber temperature Tcc is below a prescribed value LTcc. Similarly to the third embodiment, in the divided fuel injection timing, the fuel injection valve 11 is configured to inject the fuel once during the intake stroke when the piston 8''' is near the intake top dead center position and second time during the compression stroke. When the combustion chamber temperature Tcc reaches or exceeds the prescribed value LTcc, the engine controller 25" is configured to perform stratified combustion by injecting the fuel during the compression stroke in the conventional manner.

Figure 16:
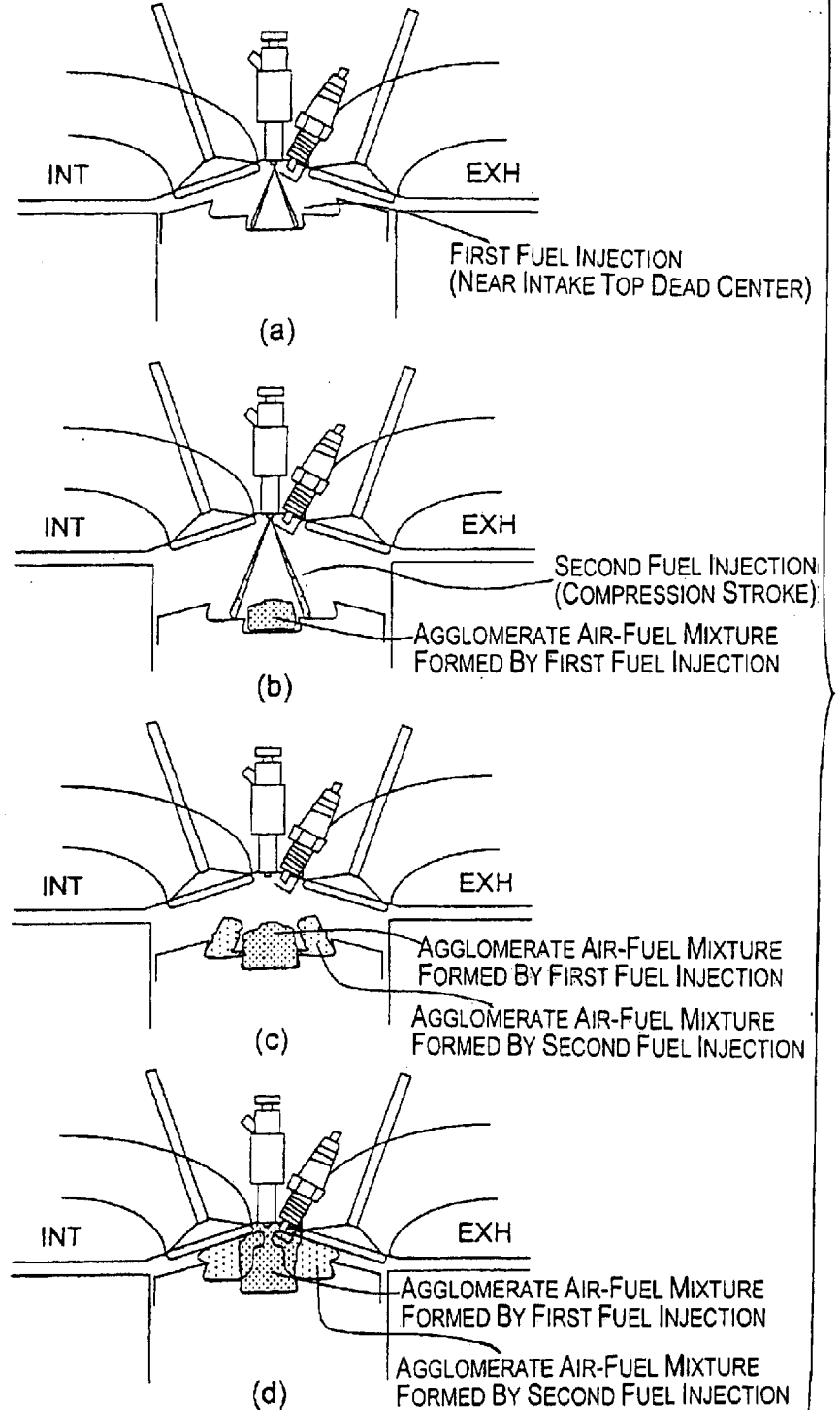
FIG. 16 is diagrammatic cross sectional views of the combustion chamber shown in FIG. 15 illustrating distribution of the air-fuel mixture in the combustion chamber in accordance with the fourth embodiment of the present invention.

FIG. 16 illustrates distribution of the air-fuel mixture in the combustion chamber 3 for performing stratified combustion when the combustion chamber temperature Tcc is below the prescribed value LTcc. The each of the diagrams (a) to (d) in FIG. 16 illustrates each stage in the development of the agglomerate stratified air-fuel mixture. The diagrams (a) to (d) arranged from top to bottom in the order of occurrence. The diagram (a) illustrates the stage when the fuel is injected while the piston 8''' is near the intake top dead center position of the intake stroke (first fuel injection). The diagram (b) illustrates the stage when the fuel is injected during the compression stroke (second fuel injection). The diagrams (c) and (d) illustrate successive stages during the compression stroke.

When the combustion chamber temperature Tcc is below the prescribed value LTcc, a prescribed amount of fuel is injected during the intake stroke while the piston 8''' is near the intake top dead center position (at the beginning of the intake stroke). The fuel is preferably injected such that the fuel stream forms a substantially hollow circular cone shape that is directed at the lower bottom wall surface 9e as seen in the diagram (a) of FIG. 16. Since the combustion chamber temperature is relatively low and the piston 8''' is close to the fuel injection valve 11 when the fuel is injected when the piston 8''' is near the intake top dead center position, the fuel injected in the first fuel injection is in a substantially liquid state and adheres to the center portion of the lower bottom wall surface 9e the cavity 9'''. The fuel adhered on the lower bottom wall surface 9e vaporizes during the period from the intake stroke to the time of ignition and forms a first agglomerate air-fuel mixture in the space above the center area of the cavity 9''' as seen in the diagram (b) of FIG. 16.

Next, the remainder of the fuel is injected during the compression stroke with a substantially hollow circular cone shaped fuel stream directed at the ring-shaped upper bottom wall surface 9f as seen in the diagram (b) of FIG. 16. The timing of the second fuel injection is set such that the fuel stream is reliably received by the upper bottom wall surface 9f when the spraying angle or an apex angle of the cone shape fuel stream of the second injection is the same as for the first fuel injection. In other words, the fuel injected in the second fuel injection reaches at the upper bottom surface 9f after relatively longer time elapses since the fuel is injected. Thus, the fuel that adheres to the upper bottom wall surface 9f vaporizes to some extent while spreading in a direction from the center axis of the cavity 9''' toward the peripheral wall surface of the cavity 9'''. Therefore, a donut-shaped second agglomerate air-fuel mixture similar to that shown in the diagram (c) of FIG. 10 of the third embodiment is formed as seen in the diagram (c) of FIG. 16.

During the remainder of the compression stroke, the first agglomerate fuel mixture formed in the center portion of the cavity 9''' by the first fuel injection is arranged to fill in the donut hole portion of the donut-shaped second agglomerate air-fuel mixture formed by the second fuel injection. As a result, a single stratified agglomerate air-fuel mixture that is substantially homogeneous is formed in the space above the cavity 9''' by the time of ignition as seen in the diagram (d) of FIG. 16. Thus, stable stratified combustion is performed.

In other words, if only a single fuel stream was injected during the compression stroke when the combustion chamber temperature Tcc is below the prescribed value LTcc, only the donut-shaped agglomerate air-fuel mixture would be formed. Thus, it would be difficult to perform stable stratified combustion. Accordingly, in the fourth embodiment of the present invention, stable stratified combustion is performed by executing the first fuel injection and the second fuel injection. More specifically, the fuel injection valve 11 is configured to inject a substantially hollow circular cone shaped fuel stream toward the lower bottom wall surface 9e while the piston 8''' is near the intake top dead center position during the intake stroke so that a first agglomerate air-fuel mixture in the vicinity of the center axis of the cavity 9''' is formed before the second fuel injection is executed during the compression stroke. Then, the fuel injection valve 11 is configured to inject a substantially hollow circular cone shaped fuel stream is directed toward the upper bottom wall surface 9f during the compression stroke to form a donut-shaped second agglomerate air-fuel mixture. Therefore, the first agglomerate air-fuel mixture fills in the donut hole portion of the donut-shaped second agglomerate air-fuel mixture. Accordingly, the combination of the first and second air-fuel mixtures form a single stratified agglomerate air-fuel mixture that is substantially homogeneous. As a result, stable stratified combustion is performed even when the combustion chamber temperature Tcc is lower than the prescribed value LTcc.

The fuel injection control executed by the engine controller 25' based on the combustion chamber temperature Tcc in accordance with the fourth embodiment of the present invention will now be described using the flowchart shown in FIG. 17. In view of the similarity between the third embodiment and the fourth embodiment, steps that are identical to those of the flowchart shown in FIG. 11 are assigned the same step numbers.

Figure 17:
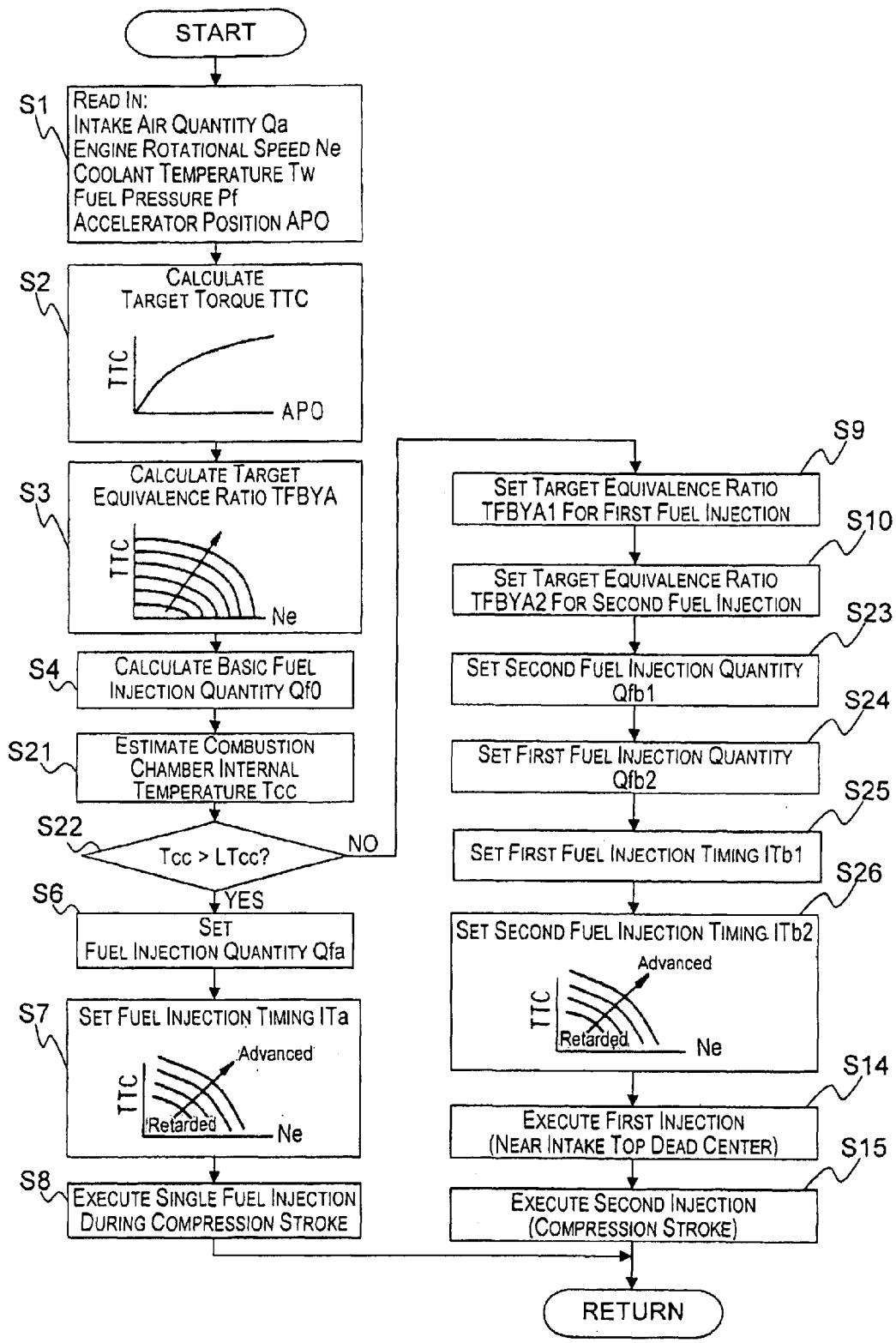
FIG. 17 is a flowchart for explaining a fuel injection control based on a temperature of the combustion chamber in accordance with the fourth embodiment of the present invention.
Figure 18:
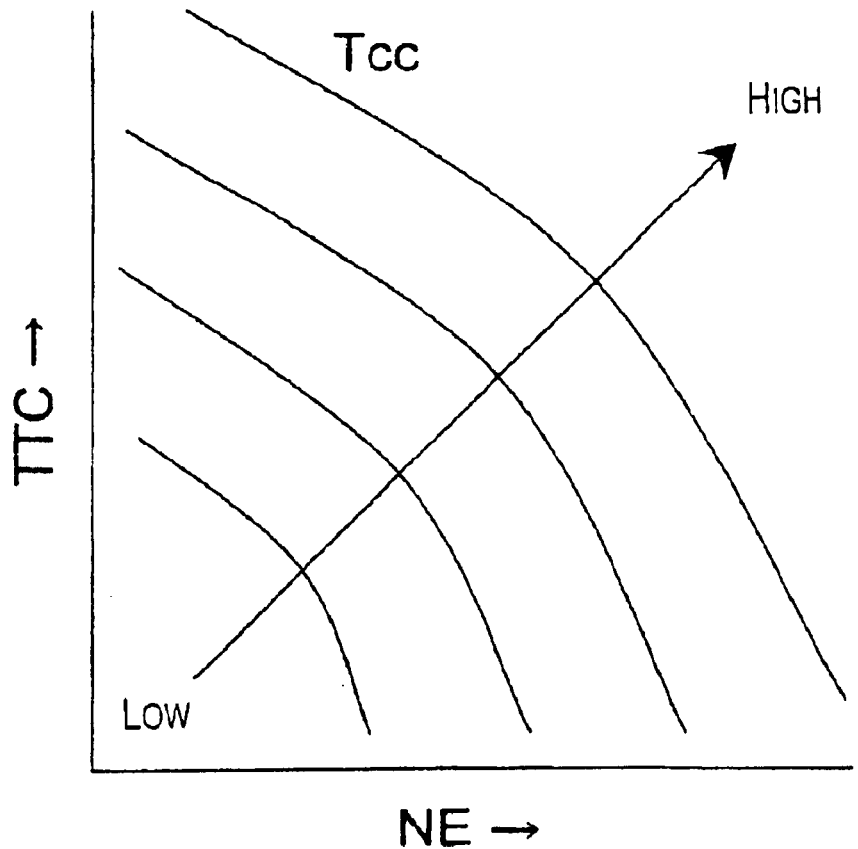
FIG. 18 is a simplified characteristic plot of the combustion chamber temperature with respect to a engine rotational speed in accordance with the fourth embodiment of the present invention.

The main differences of the control executed in the fourth embodiment to the control of the third embodiment shown in the flowchart of FIG. 11 are in the operations of steps S21 to S26 shown in FIG. 17. In step S21, the engine controller 25" is configured to estimate the combustion chamber temperature Tcc. The characteristic of the combustion chamber temperature Tcc with respect to the engine rotational speed Ne and the target torque TTC is preferably experimentally obtained in advance and stored as map data in the memory of the engine controller 25" as shown in the simplified characteristic plot of FIG. 18. Thus, the engine controller 25" is preferably configured to estimate the combustion temperature Tcc by referring to the map data based on the engine rotational speed Ne and the target torque TTC.

Figure 19:
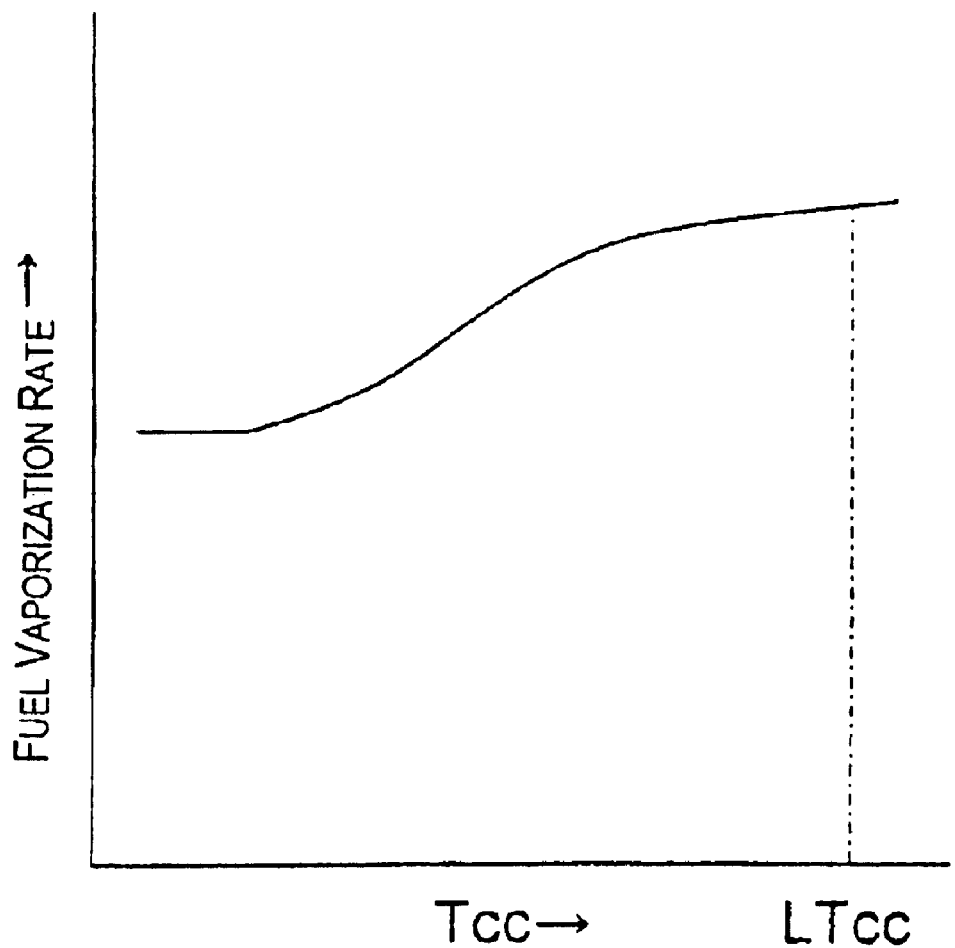
FIG. 19 is a simplified characteristic plot illustrating the relationship between the fuel vaporization ratio and the combustion chamber temperature in accordance with the fourth embodiment of the present invention.

In step S22, the engine controller 25" is configured to compare the combustion chamber temperature Tcc to the prescribed value LTcc. The prescribed value LTcc is set to a minimum combustion chamber temperature required to obtain a fuel vaporization ratio that is sufficient to form a stratified air-fuel mixture that is substantially homogeneous (non lean portions) in the space above the center portion of the cavity 9''' when a single fuel is injected during the compression stroke. FIG. 19 shows an example of a fuel vaporization ratio characteristic with respect to the combustion chamber temperature Tcc. The actual value of the prescribed value LTcc is preferably experimentally obtained in advance and stored in the memory of the engine controller 25". If the combustion chamber temperature Tcc is equal to or higher than the prescribed value LTcc in step S22, the injected fuel vaporizes readily and a stratified agglomerate air-fuel mixture that is substantially homogeneous is formed in the space above the center portion of the cavity 9''' even if a single fuel stream is injected during the compression stroke. Therefore, when the combustion chamber temperature Tcc is equal to or higher than the prescribed value LTcc, the engine controller 25" is configured to proceed to steps S6 to S8 and execute the stratified combustion by injecting a single fuel stream during the compression stroke.

On the other hand, if the combustion chamber temperature Tcc is below the prescribed value LTcc in step S22, the fuel does not vaporize sufficiently if a single fuel stream is injected during the combustion stroke and a stratified air-fuel mixture that is substantially homogeneous is not formed in the space above the cavity 9'''. Therefore, when the combustion chamber temperature Tcc is below the prescribed value LTcc in step S22, the engine controller 25" is configured to proceed to step S9 and subsequent steps to perform stratified combustion by executing the divided fuel injection timing. As mentioned above, the divided fuel injection timing comprises one fuel injection during the intake stroke while the piston 8''' is near the intake top dead center position (at the beginning of the intake stroke) and a second fuel injection during the compression stroke.

Similarly to the third embodiment, in steps S9 and S10 the engine controller 25" is configured to set the target equivalence ratios TFBYA1, TFBYA2 for the first and second fuel injections.

Figure 20A:
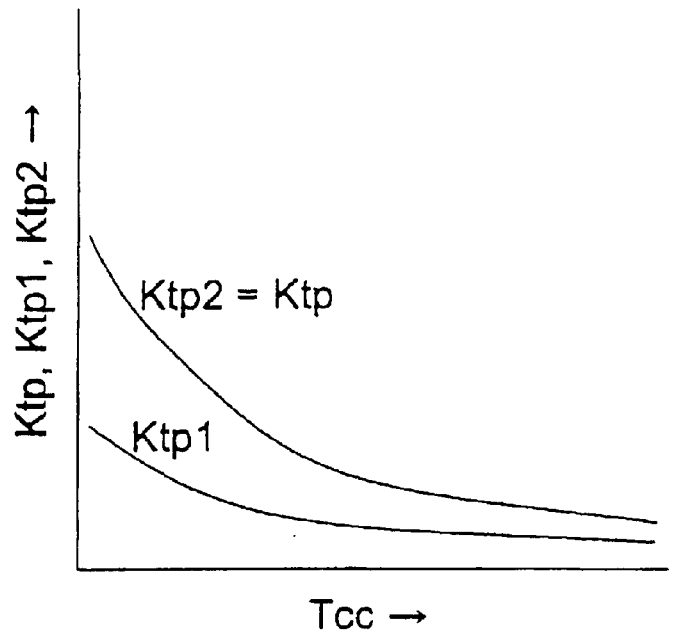
FIG. 20(a) is a simplified characteristic plot of the compensation coefficients for a fuel vaporization ratio with respect to the combustion chamber temperature when the divided fuel injection timing is executed in accordance with the fourth embodiment of the present invention.
Figure 20B:
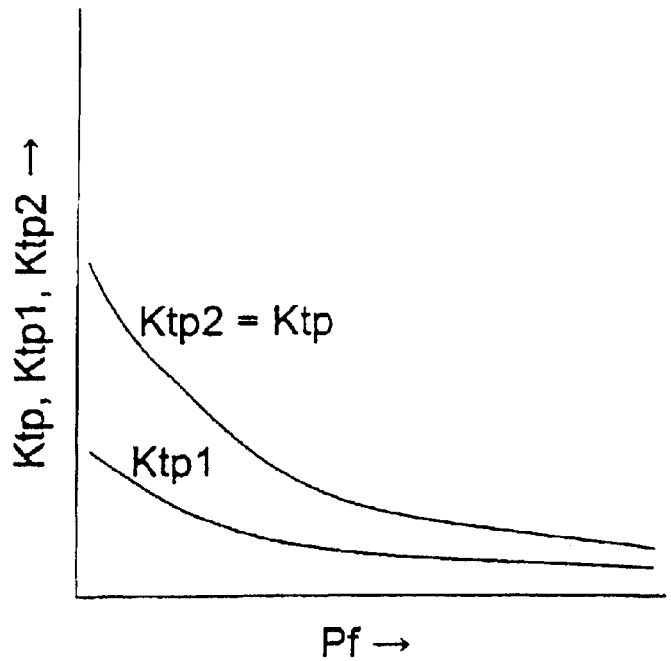
FIG. 20(b) is a simplified characteristic plot of the compensation coefficients for a fuel vaporization ratio with respect to the fuel pressure when the divided fuel injection timing is executed in accordance with the fourth embodiment of the present invention.

In steps S23 and S24, the engine controller 25" is configured to set the fuel injection quantities Qfb1 and Qfb2 using the previously presented equations (13) and (14). However, in the fourth embodiment, the compensation coefficients Ktp1 and Ktp2 as well as the compensation coefficient Ktp of step S6 of FIG. 17 for adjusting the fuel vaporization degree preferably have characteristics similar to the simplified characteristic plot of FIGS. 20(*a*) and 20(*b*). In other words, the compensation coefficients are found as a function of the combustion chamber temperature Tcc instead of the coolant temperature Tw as in the third embodiment. Thus, in the fourth embodiment of the present invention, the compensation coefficients Ktp1 and Ktp2 are preferably found based on the combustion chamber temperature Tcc as seen in FIG. 20(*a*). The combustion chamber temperature Tcc has a strong correlation with the vaporization degree of the fuel inside the combustion chamber 3. Thus, the basic fuel injection quantity Qf0 is revised in accordance with the fuel vaporization degree using the compensation coefficients Ktp1 and Ktp2 in steps S23 and S24. In this way, the fuel injection quantities Qfb1 and Qfb2 used in the divided fuel injection timing can be calculated with even greater accuracy.

Figure 21:
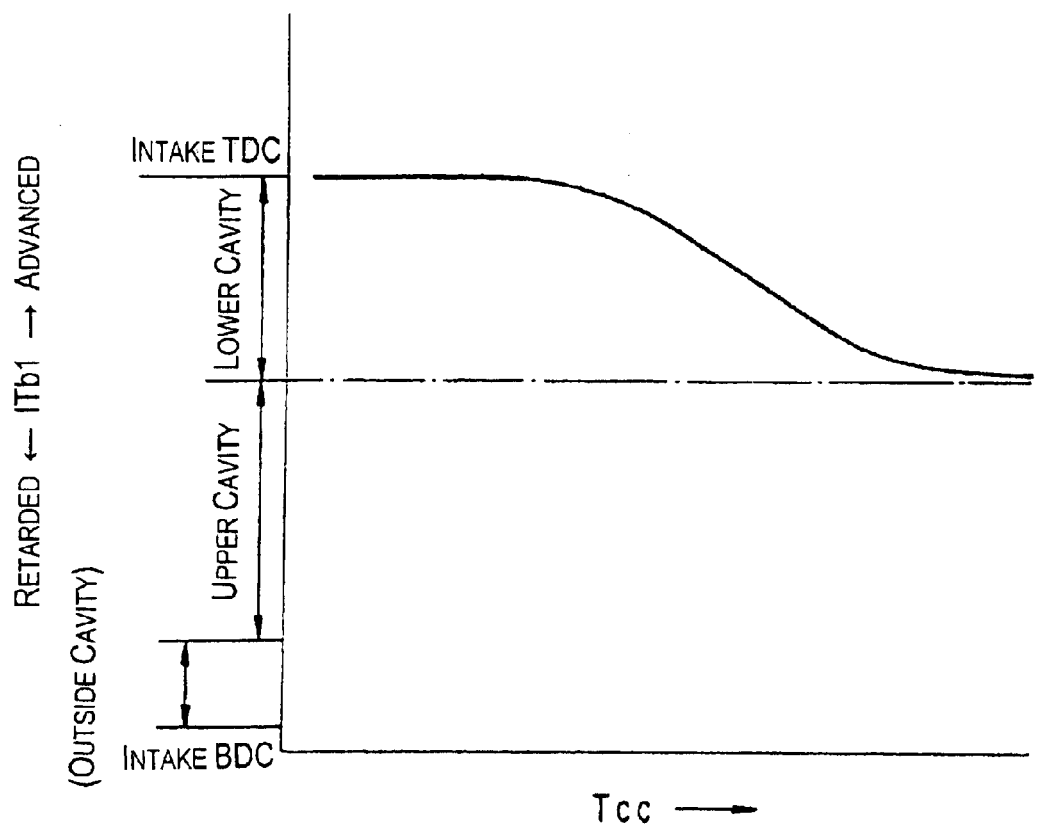
FIG. 21 is a simplified characteristic plot of a first divided fuel injection timing of the divided fuel injection timing in accordance with the fourth embodiment of the present invention.

In step S25, the engine controller 25" is configured to set the first divided fuel injection timing ITb1 of the first fuel injection timing of the divided fuel injection timing. The first divided fuel injection timing ITb1 is calculated differently than in the third embodiment. More specifically in the fourth embodiment of the present invention, the first divided fuel injection timing ITb1 is preferably calculated as a function of the combustion chamber temperature Tcc. For example, as shown in FIG. 21, the initial value of the first divided fuel injection timing ITb1 is set to the intake top dead center position during the intake stroke. Then, as the combustion chamber temperature Tcc increases, the first divided fuel injection timing ITb1 is retarded gradually within the range of crankshaft angles at which the substantially hollow circular cone shaped fuel stream will be directed to the lower bottom wall surface 9e. The table data of the first divided fuel injection timing ITb1 as a function of the combustion chamber temperature Tcc is preferably stored in the memory of the engine controller 25" so that the engine controller 25" is preferably configured to determine the first divided fuel injection timing ITb1 by referring to the table data based on the combustion chamber temperature Tcc.

In step S26, the engine controller 25" is configured to set the second divided fuel injection timing ITb2 of the second fuel injection of the divided fuel injection timing in the similar manner as in the third embodiment. In other words, the engine controller 25" is configured to set the second divided fuel injection timing ITb2 based on the engine rotational speed Ne and the target torque TTC. Moreover, in the fourth embodiment, the second divided fuel injection timing ITb2 is set within the range of crankshaft angles at which the substantially hollow circular cone shaped fuel stream will be directed to the upper bottom wall surface 9f.

In step S14, the engine controller 25" is configured to perform the first fuel injection during the intake stroke while the piston 8''' is near the intake top dead center position based on the first fuel injection quantity Qfb1 and the first divided fuel injection timing ITb1. In step S15, the engine controller 25" is configured to perform the second fuel injection during the compression stroke based on the second fuel injection quantity Qfb2 and the second divided fuel injection timing ITb2 to perform stratified combustion.

According to the fourth embodiment of the present invention, when the combustion chamber temperature Tcc is below a prescribed value LTcc, part of the fuel is injected while the piston 8''' is at the intake top dead center position such that the substantially hollow-circular-cone shaped fuel stream is directed toward the lower bottom wall surface 9e of the cavity 9'''. The fuel adhered to the lower bottom wall surface 9e forms a first agglomerate air-fuel mixture that gathers in the lower cavity. Therefore, the first agglomerate air-fuel mixture is prevented from diffusing radially outwardly from the lower cavity inside the combustion chamber 3. The first agglomerate air fuel mixture and the second agglomerate air fuel mixture formed by the second fuel injection form a stratified air-fuel mixture that is substantially homogeneous in the space above the cavity 9'''. As a result, stable stratified combustion is performed.

When the combustion chamber temperature Tcc is relatively low, if a single fuel stream was injected during the compression stroke, it would be difficult to achieve stratified combustion because the vaporization of the fuel is slow and only a donut-shaped agglomerate air-fuel mixture is formed inside the combustion chamber 3. Therefore, the fourth embodiment is configured to execute a divided fuel injection timing (steps S22, S9, S10, S23, S24, S25, S26, S14, and S15 of FIG. 17) when the combustion chamber temperature Tcc is lower than the prescribed value LTcc. Thus, a stratified air-fuel mixture that is substantially homogeneous is formed in the space above the cavity 9 even when the combustion chamber temperature Tcc is relatively low. As a result, stable stratified combustion is performed even when the combustion chamber temperature Tcc declines during operation after the engine is warmed up.

When the combustion chamber temperature Tcc is below the prescribed value LTcc, the divided fuel injection timing is executed. However, as the combustion chamber temperature Tcc rises, the amount of time required for the fuel adhered to the upper bottom wall surface 9f to vaporize will decrease and the degree to which the vaporized fuel diffuses will increase. Consequently, when the combustion chamber temperature Tcc is relatively higher, the fuel may be excessively vaporized and the air-fuel mixture of the appropriate size may not be obtained if the same first divided fuel injection timing ITb1 is used as when the combustion chamber temperature Tcc is low. Therefore, in the fourth embodiment, the first divided fuel injection timing ITb1 is gradually retarded as the combustion chamber temperature Tcc increases as seen in FIG. 21. As a result, by adjusting the first divided fuel injection timing ITb1 in accordance with the time required for the fuel to vaporize after it is injected, stable stratified combustion is accomplished even when the combustion chamber temperature Tcc is high.

Furthermore, when the combustion chamber temperature Tcc is below the prescribed value LTcc, the degree of vaporization of the fuel adhered to the lower bottom wall surface 9e will increase as the combustion chamber temperature Tcc rises. Consequently, when the combustion chamber temperature Tcc is relatively higher, some of the injected fuel will be unnecessary and the amount of unburned HC discharged in the exhaust will probably increase if the same first fuel injection quantity Qfb1 is used as when the combustion chamber temperature Tcc is low. Therefore, in the fourth embodiment, the first fuel injection quantity Qfb1 is reduced by the compensation coefficient Ktp1 as the combustion chamber temperature Tcc increases as seen in FIG. 20(a). As a result, the fuel used for conducting stratified combustion can be held to a minimum (i.e., the injection of unnecessary fuel can be prevented) and the amount of unburned HCs discharged can be held to a minimum.

The combustion chamber temperature Tcc has an even stronger correlation with the degree of vaporization of the fuel inside the combustion chamber 3 among the various measures corresponding to an engine temperature. Therefore, the fourth embodiment is configured to estimate the combustion chamber temperature Tcc and execute the divided fuel injection timing when the combustion chamber temperature Tcc is lower than the prescribed temperature LTcc. As a result, the precision of the determination as to whether or not the divided fuel injection timing should be used can be improved.

Moreover, as mentioned above, when the combustion chamber temperature Tcc is below the prescribed value LTcc, the divided fuel injection timing is executed. However, as the combustion chamber temperature Tcc rises, the amount of time required for the fuel adhered to the lower bottom wall surface 9e to vaporize will decrease and the degree to which the vaporized fuel diffuses will increase. On the other hand, if the first divided fuel injection timing ITb1 is retarded too much, the substantially hollow circular cone shaped fuel stream will not be directed to the lower bottom wall surface 9e of the cavity 9''' and a first agglomerate air-fuel mixture will not be formed in the center portion of the cavity 9'''. Therefore, the fourth embodiment is configured to retard the first divided fuel injection timing ITb1 within the range of crankshaft angles at which the substantially hollow circular cone shaped fuel stream will be directed to the lower bottom wall surface 9e as seen in FIG. 21. As a result, the first agglomerate air-fuel mixture formed by the fuel adhered to the lower bottom wall surface 9e can be reliably contained in the lower cavity of the cavity 9'''. Therefore, the first agglomerate air-fuel mixture is prevented from diffusing radially outwardly from the lower cavity inside the combustion chamber 3. Thus, stable stratified combustion is accomplished even when the combustion chamber temperature Tcc is relatively high utilizing the divided fuel injection timing.

Fifth Embodiment

Figure 22:
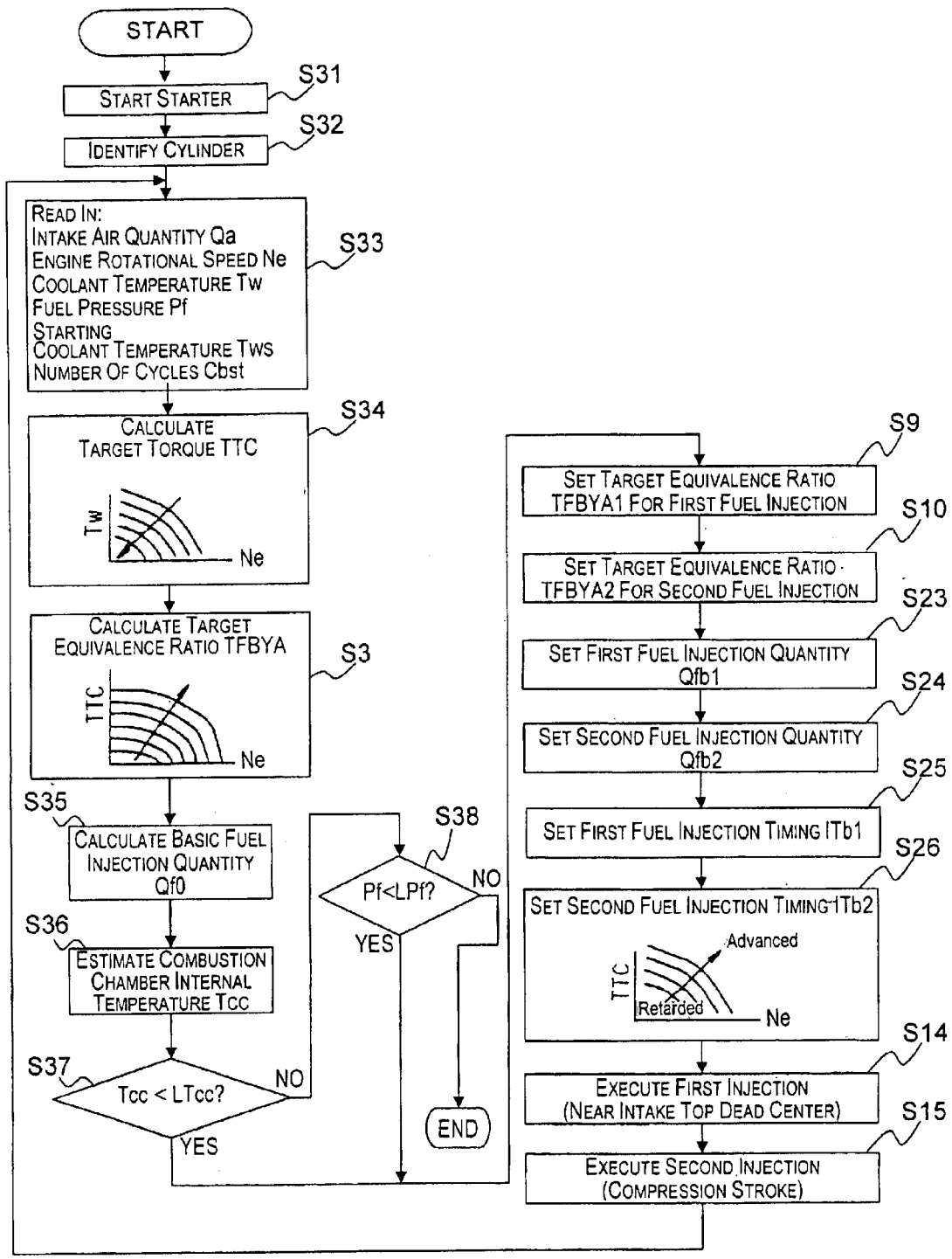
FIG. 22 is a flowchart for explaining a fuel injection control based on a combustion chamber temperature specifically for times when the engine has just been started in accordance with a fifth embodiment of the present invention.
Figure 23:
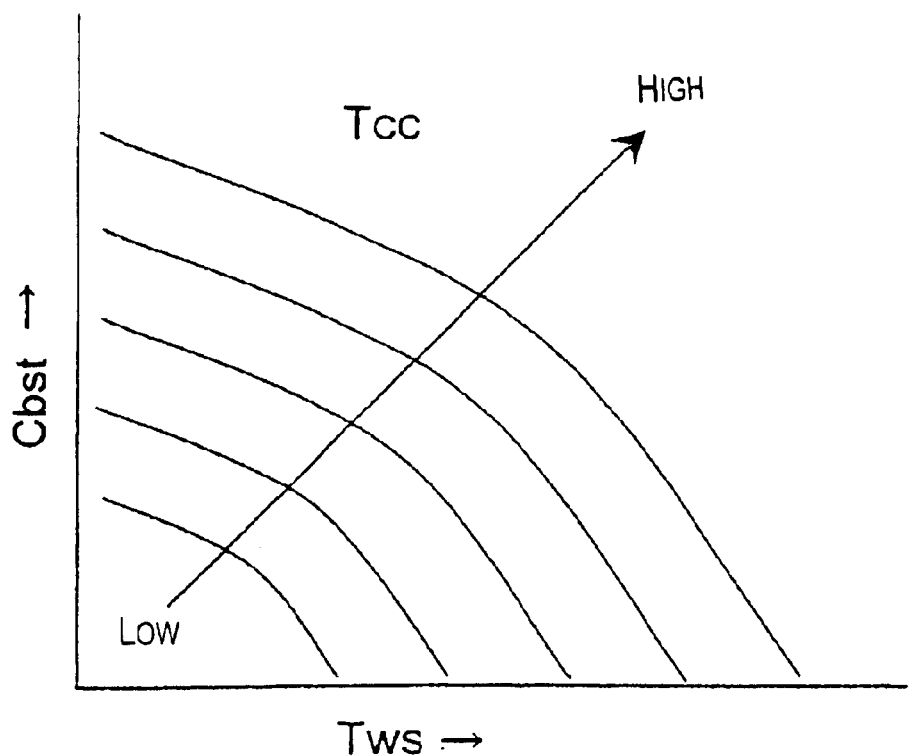
FIG. 23 is a simplified characteristic plot of the combustion chamber temperature immediately after the engine has been started in accordance with the fifth embodiment of the present invention.

Referring now to FIGS. 22 and 23, a fuel injection control device in accordance with a fifth embodiment will now be explained. In view of the similarity between the first to fourth embodiments and the fifth embodiment, the parts of the fifth embodiment that are identical to the parts of the first to fourth embodiments will be given the same reference numerals as the parts of the first to fourth embodiments. Moreover, the descriptions of the parts of the fifth embodiment that are identical to the parts of the first to fourth embodiments may be omitted for the sake of brevity.

Basically, the fifth embodiment of the present invention differs from the fourth embodiment only in that the engine controller 25" is configured to perform a control flow for when the engine is first started as well as the control flow of the fourth embodiment explained above. Thus, the structure of the direct fuel injection engine of the fourth embodiment shown in FIG. 15 can be utilized in the fifth embodiment. Of course, it will be apparent to those skilled in the art from this disclosure that the control flow of the fifth embodiment can be adapted to the direct fuel injection engine utilized in the third embodiment shown in FIG. 9.

FIG. 22 is a flowchart for the fuel injection control executed by the fifth embodiment based on the combustion chamber temperature Tcc when the engine is first started. The steps that are the same as those of the flowchart of the fourth embodiment shown in FIG. 17 are assigned the same step numbers.

In step S31, the ignition switch is turned from the OFF position to the ON position and further to the starter actuation position. The starter is configured and arranged to rotate and begin cranking the engine. In step S32, the engine controller 25" is configured to identify the cylinders using the signal issued from the crank angle sensor 33 in response to the rotation of the engine. In step S33, the engine controller 25" is configured to read in the intake air quantity Qa, the engine rotational speed Ne, the fuel pressure Pf, the coolant temperature Tw, a starting coolant temperature Tws, and the number of cycles Cbst for each cylinder since the initial firing. The number of cycles Cbst for each cylinder since the initial firing can be determined based on the number of injections executed by the fuel injection valve 11 or the number of spark ignitions executed by the spark plug 12.

In step S34, the engine controller 25" is configured to calculate the target torque TTC based on the coolant temperature Tw and the engine rotational speed Ne. In step S3, the engine controller 25" is configured to find the target equivalence ratio TFBYA based on the target torque TTC and the engine rotational speed Ne.

In step S35, the engine controller 25" is configured to calculate the basic fuel injection quantity Qf0. The basic fuel injection quantity Qf0 is preferably calculated using basically the same method as in step S4 of FIG. 11 in the third embodiment. However, the intake air quantity Qa cannot be detected during the first few cycles after the engine is started because of the rush current in the airflow meter 31. Consequently, the basic fuel injection quantity Qf0 cannot be calculated using the same method as step S4 of FIG. 11 during the first few cycles after the engine is started. Therefore, the characteristic of the basic fuel injection quantity Qf0 with respect to the coolant temperature Tw and the engine rotational speed Ne are preferably obtained experimentally in advance and stored as map data in the memory of the engine controller 25". Then, the basic fuel injection quantity Qf0 can be obtained during the first few cycles after the engine is started by referring to the map data based on the coolant temperature Tw and the engine rotational speed Ne.

In step S36, the engine controller 25 is configured to estimate the combustion chamber temperature Tcc. The combustion chamber temperature Tcc has a characteristic shown in FIG. 23 with respect to the starting coolant temperature Tws and the number of cycles Cbst for each cylinder since the initial firing. The characteristic of the combustion chamber temperature Tcc is preferably obtained experimentally in advance and stored as map data in the memory of the engine controller 25". Then the combustion temperature Tcc is preferably estimated by referring to the map data based on the starting coolant temperature Tws and the number of cycles Cbst for each cylinder since the initial firing.

In step S37, the engine controller 25" is configured to compare the combustion chamber temperature Tcc to the prescribed value LTcc. In step S38, the engine controller 25" is configured to compare the fuel pressure Pf to the prescribed value LPf. The prescribed value LTcc is the same value as the prescribed value LTcc used in step S22 of FIG. 17 in the fourth embodiment. The prescribed value LPf is the same value as the prescribed value LPf used in step S5 of FIG. 11 in the third embodiment. Therefore, in the fuel injection control for when the engine is first started, when the combustion chamber temperature Tcc is below the prescribed value LTcc and when the combustion chamber temperature Tcc is above the prescribed value LTcc but the fuel pressure Pf is below the prescribed value LPf, the engine controller 25" is configured to perform stratified combustion by executing the divided fuel injection timing comprising the first fuel injection performed while the piston 8''' is near the intake top dead center position (at the beginning of the intake stroke) and the second fuel injection performed during the combustion stroke. In other words, if the fuel pressure Pf is below the prescribed value LPf in step S38, the engine controller 25" is configured to execute the divided fuel injection timing by proceeding to steps S9, S10, S23, S24, S25, S26, S14, and S15.

When the combustion chamber temperature Tcc is equal to or above the prescribed value LTcc and the fuel pressure Pf is equal to or above the prescribed value LPf, the engine controller 25" is configured to end the fuel injection control for when the engine has just been started and shift to the post-engine-starting fuel injection control of the third embodiment or fourth embodiment shown in FIG. 2 or 8.

During cold starting when the combustion chamber temperature Tcc is below the prescribed value LTcct, it is difficult to achieve stable stratified combustion with a single fuel injection performed during the compression stroke because only a donut-shaped agglomerate air-fuel mixture is formed inside the combustion chamber 3. Therefore, the fifth embodiment is configured to execute the divided fuel injection timing comprising the first fuel injection executed before the compression stroke and the second fuel injection executed during the compression stroke when the combustion chamber temperature Tcc is below the prescribed value LTcc. More specifically, the first fuel injection is executed while the piston 8''' is near the top dead center position of the intake stroke such that the substantially hollow circular cone shaped fuel stream is directed to the lower bottom wall surface 9e and forms the first agglomerate air-fuel mixture in the vicinity of the center axis of the cavity 9'''. The second fuel injection is execute during the compression stroke such that the substantially hollow circular cone shaped fuel stream is directed to the upper bottom wall surface 9f and forms the donut-shaped second agglomerate air-fuel mixture. The first agglomerate air-fuel mixture is arranged to fill in the donut hole portion of the donut-shaped second agglomerate air-fuel mixture. Thus, the combination of the first and second air-fuel mixtures forms a single stratified agglomerate air-fuel mixture that is substantially homogeneous in the space above the cavity 9. As a result, stable stratified combustion is performed during the period from cold starting until the engine is warmed up when the combustion chamber temperature Tcc is relatively low.

In the fourth and fifth embodiments, the combustion chamber temperature Tcc is estimated and used (1) to determine whether or not to execute the divided fuel injection timing, (2) to set the fuel injection quantities Qfb1 and Qfb2 of the divided fuel injection timing, and (3) to set the first divided fuel injection timing ITb1 of the first fuel injection of the divided fuel injection timing. However, since the temperature of the top surface 8a''' of the piston 8''' is also estimated in the same manner as the combustion chamber temperature Tcc, a piston top surface temperature may be used instead of the combustion chamber temperature to carry out the present invention. Since the vaporization degree of fuel adhered to the cavity wall changes with the piston top surface temperature and the vaporization degree of fuel injected from the fuel injection valve changes with the combustion chamber temperature. Therefore, the accuracy of the fuel injection control of the present invention will be increased by estimating the fuel vaporization degree with respect to the piston top surface temperature and/or the combustion chamber temperature Tcc.

Moreover, the present invention is not limited to be adapted to the direct fuel injection engines shown in FIGS. 1, 8, 9 and 15. The invention can also be applied to a conventional direct fuel injection engine such as an engine presented in Japanese Laid-Open Patent Publication No. 11-82028 and achieve the substantially same effects.

Although in the third to fifth embodiments the fuel injection valve 11 is positioned in the approximate center of the upper portion of the combustion chamber, the present invention is not limited to this arrangement. More specifically, the fuel injection valve 11 can be positioned on the outside periphery of the upper portion of the combustion chamber 3 as shown in FIG. 8 in the second embodiment of the present invention.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-125192 and 2003-126345. The entire disclosures of Japanese Patent Application Nos. 2003-125192 and 2003-126345 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fuel injection control device for a direct fuel injection engine, comprising:
    a fuel injection valve configured and arranged to directly inject a first fuel stream per cycle into a combustion chamber;
    at least one sensor configured and arranged to determine at least one engine operation parameter that affects formation of a stratified air-fuel mixture inside the combustion chamber; and
    a controller configured to selectively control the fuel injection valve to use a first fuel injection timing when the controller determines that a stratified air-fuel mixture will be difficult to form during a second fuel injection timing based on a determination of the engine operation parameter by the at least one sensor, the first fuel injection timing being set to control the injection valve to inject the first fuel stream during an intake stroke while a piston in the combustion chamber is approximately at an intake top dead center position such that a majority of the first fuel stream injected from the fuel injection valve is received inside a cavity formed on the piston.

2. The fuel injection control device as recited in claim 1, wherein
    the fuel injection valve is positioned at a substantially upper center portion of the combustion chamber such that the first fuel stream is injected at the cavity formed in a substantially center portion of a top surface of the piston.

3. The fuel injection control device as recited in claim 2, wherein
    the fuel injection valve is configured and arranged to inject the first fuel stream with a substantially hollow cone shape.

4. The fuel injection control device as recited in claim 3, wherein
    the controller is further configured to inject a second fuel stream per cycle when using the first fuel injection timing such that the second fuel stream is injected during the compression stroke after the first fuel stream is injected during the intake stroke while the piston is approximately at the intake top dead center position.

5. The fuel injection control device as recited in claim 4, wherein
    the controller is further configured to inject the first fuel stream when using the first fuel injection timing such that the first fuel stream is directed toward a substantially center portion of a bottom wall surface of the cavity having a substantially cylindrical peripheral wall surface smoothly connected to the bottom wall surface, and
    the controller is further configured to inject the second fuel stream when using the first fuel injection timing such that the second fuel stream is directed toward a radially outer periphery of the bottom wall surface of the cavity.

6. The fuel injection control device as recited in claim 4, wherein
    the controller is further configured to inject the first fuel stream when using the first fuel injection timing such that the first fuel stream is directed toward a lower bottom wall surface of the cavity including
        a substantially cylindrical lower peripheral wall surface smoothly connected to the lower bottom wall surface,
        a substantially cylindrical upper peripheral wall surface that is positioned higher than the lower peripheral wall surface and has a larger diameter than the lower peripheral wall surface, and
        a ring-shaped upper bottom wall surface disposed between the lower peripheral wall surface and the upper peripheral wall surface and smoothly connected to the upper peripheral wall surface, and
    the controller is further configured to inject the second fuel stream when using the first fuel injection timing such that the second fuel stream is directed toward the upper bottom wall surface of the cavity.

7. The fuel injection control device as recited in claim 4, wherein
    the controller is further configured to inject the first fuel stream and the second fuel stream when using the first fuel injection timing upon determining engine temperature of the direct fuel injection engine is lower than a prescribed temperature.

8. The fuel injection control device as recited in claim 7, wherein
    the controller is further configured to steadily retard a first divided fuel injection timing of the first fuel stream as the temperature of the direct fuel injection engine gets higher.

9. The fuel injection control device as recited in claim 7, wherein
    the controller is further configured to steadily decrease a fuel injection amount of the first fuel stream as the temperature of the direct fuel injection engine gets higher when using the second fuel injection timing.

10. The fuel injection control device as recited in claim 7, wherein
    the controller is configured to detect the engine temperature of the direct fuel injection engine by speculating at least one of a top surface temperature of the piston and an inside temperature of the combustion chamber.

11. The fuel injection control device as recited in claim 7, wherein
    the controller is further configured to steadily retard a first divided fuel injection timing of the first fuel stream within a range that the substantially hollow cone shape first fuel stream remains directed at the lower bottom wall surface.

12. The fuel injection control device as recited in claim 4, wherein the controller is further configured to inject the first fuel stream and the second fuel stream when using the first fuel injection timing upon determining fuel pressure is lower than a prescribed fuel pressure.

13. The fuel injection control device as recited in claim 12, wherein the controller is further configured to steadily decrease a fuel injection amount of the first fuel stream as the fuel pressure gets higher when using the first fuel injection timing.

14. The fuel injection control device as recited in claim 4, wherein the controller is further configured to inject the second fuel stream during the compression stroke when the piston is at a position lower than a position of the piston when the first fuel stream is injected during the intake stroke when using the first fuel injection timing.

15. The fuel injection control device as recited in claim 1, wherein the controller is further configured to determine that the stratified air-fuel mixture will be difficult to form inside the combustion chamber based on determining engine temperature of the direct fuel injection engine being lower than a prescribed temperature.

16. The fuel injection control device as recited in claim 1, wherein the controller is further configured to determine that the stratified air-fuel mixture will be difficult to form inside the combustion chamber based on determining fuel pressure being lower than a prescribed fuel pressure.

17. The fuel injection control device as recited in claim 1, wherein the controller is further configured to inject the first fuel stream in an amount that corresponds to a total fuel injection amount for a single combustion cycle when using the first fuel injection timing.

18. The fuel injection control device as recited in claim 17, further comprising the controller is further configured to prohibit the fuel injection valve from using the first fuel injection timing based on the controller determining a fuel diffusion parameter indicative of excessive diffusion of the fuel injected in the first fuel stream such that the stratified air-fuel mixture will not be formed at a time of ignition inside the combustion chamber when using the first fuel injection timing.

19. The fuel injection control device as recited in claim 18, wherein the controller is configured to determine that the fuel injected in the first fuel stream will be excessively diffused based on engine temperature of the direct fuel injection engine as the fuel diffusion parameter.

20. The fuel injection control device as recited in claim 18, wherein the controller is configured to determine that the fuel injected in the first fuel stream will be excessively diffused based on fuel pressure as the fuel diffusion parameter.

21. The fuel injection control device as recited in claim 18, wherein the controller is configured to determine that the fuel injected in the first fuel stream will be excessively diffused based on a number of combustion cycles performed since the direct fuel injection engine was started as the fuel diffusion parameter.

22. The fuel injection control device as recited in claim 18, wherein the controller is configured to determine that the fuel injected in the first fuel stream will be excessively diffused based on rotational speed of the direct fuel injection engine as the fuel diffusion parameter.

23. The fuel injection control device as recited in claim 18, wherein the controller is further configured to selectively control the fuel injection valve using the second fuel injection timing such that the first fuel stream is injected during a compression stroke with a majority of the first fuel stream being received inside the cavity when the controller determines the fuel injected in the first fuel stream will be excessively diffused such that the stratified air-fuel mixture will not be formed at the time of ignition when using the first fuel injection timing.

24. The fuel injection control device as recited in claim 18, wherein the controller is further configured to calculate a first fuel vaporization ratio of fuel inside the combustion chamber based on the fuel diffusion parameter when using the first fuel injection timing, the controller is further configured to calculate a first fuel injection amount obtained by compensating an amount of fuel in the first fuel stream when using the first fuel injection timing upon the first fuel vaporization ratio indicating a part of the fuel in the first fuel stream will not be combusted because the part of the fuel is vaporized and drawn outside of the cavity, the controller is further configured to compare the first fuel injection amount to the second fuel injection amount that is injected when using the second fuel injection timing in which the first fuel stream is injected during the compression stroke with a majority of the first fuel stream being received inside the cavity, and the controller is further configured to use the second fuel injection timing when the second fuel injection amount is larger than the first fuel injection amount.

25. The fuel injection control device as recited in claim 24, wherein the controller is further configured to calculate the first fuel vaporization ratio based on at least one of the engine temperature of the direct fuel injection engine, the rotational speed of the direct fuel injection engine, the number of combustion cycles performed since the direct fuel injection engine was started and the fuel pressure as the fuel diffusion parameter.

26. The fuel injection control device as recited in claim 24, wherein the controller is further configured to calculate a second fuel vaporization ratio of the first fuel stream when using the second fuel injection timing to inject the first fuel stream during the compression stroke such that a majority of the first fuel stream is received inside the cavity based on the at least one fuel diffusion parameter, and the controller is further configured to compensate the second fuel injection amount of the first fuel stream injected during the compression stroke using the second fuel injection timing such that the majority of the fuel stream is received inside the cavity based on the second fuel vaporization ratio when the controller determines to inject the first fuel stream by using the second fuel injection timing.

27. A fuel injection control method for a direct fuel injection engine, comprising:

determining at least one engine operation parameter that affects formation of a stratified air-fuel mixture inside a combustion chamber;

determining whether to use one of a first fuel injection timing and a second fuel injection timing when using the second fuel injection timing will be difficult to form the stratified air-fuel mixture based on a determination of the engine operation parameter; and injecting a first fuel stream using the first fuel injection timing to inject the first fuel stream while a piston is approximately at an intake top dead center position such that a majority of the first fuel stream is received inside a cavity formed on the piston, when a determination has been made that using the second fuel injection timing will be difficult to form the stratified air-fuel mixture.

28. A fuel injection control device for a direct fuel injection engine, comprising:

fuel injection means for directly injecting a first fuel stream per cycle into a combustion chamber;

engine operation parameter detecting means for determining at least one engine operation parameter that affects formation of a stratified air-fuel mixture inside the combustion chamber; and control means for controlling the fuel injection means to select one of a first fuel injection timing and a second fuel injection timing when the control means determines that using the second fuel injection timing will be difficult to form the stratified air-fuel mixture based on a determination of the engine operation parameter detecting means, the control means being configured to control the fuel injection means during the first fuel injection timing to inject the first fuel stream while a piston in the combustion chamber is approximately at an intake top dead center position such that a majority of the first fuel stream injected from the fuel injection means is received inside a cavity formed on the piston.

* * * * *